United States Patent
Poling, Sr. et al.

(10) Patent No.: US 8,231,428 B2
(45) Date of Patent: *Jul. 31, 2012

(54) TIRE PROFILE GENERATING MACHINE AND RELATED METHODS

(75) Inventors: David Poling, Sr., Akron, OH (US); James R. Shively, Uniontown, OH (US); Brian D. Mitchell, Akron, OH (US); Matthew C. Blubaugh, Akron, OH (US); David L. Poling, Jr., Akron, OH (US); Richard Delmoro, Tallmadge, OH (US); David Krause, Bowerston, OH (US)

(73) Assignee: Akron Special Machinery, Inc., Akron, OH (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/894,462

(22) Filed: Sep. 30, 2010

(65) Prior Publication Data

US 2011/0034108 A1  Feb. 10, 2011

Related U.S. Application Data

(63) Continuation-in-part of application No. 12/004,813, filed on Dec. 20, 2007, now Pat. No. 8,157,613, which is a continuation-in-part of application No. 11/508,390, filed as application No. PCT/US2005/006377 on Feb. 28, 2005, now Pat. No. 7,381,114.

(60) Provisional application No. 60/548,495, filed on Feb. 27, 2004.

(51) Int. Cl.
*B24B 49/00* (2012.01)

(52) U.S. Cl. .......................................... 451/5; 451/920
(58) Field of Classification Search ............ 451/5, 9–11, 451/51, 178, 258, 340–342, 920; 157/13
See application file for complete search history.

(56) References Cited

U.S. PATENT DOCUMENTS

| | | | |
|---|---|---|---|
| 3,218,208 A | 11/1965 | Molen | 156/116 |
| 3,574,973 A | 4/1971 | Rader | 451/26 |
| 3,724,137 A | 4/1973 | Hofelt, Jr. et al. | 451/254 |
| 3,910,337 A * | 10/1975 | Pelletier | 157/13 |
| 4,080,230 A | 3/1978 | Batchelor et al. | 156/96 |
| 4,515,200 A | 5/1985 | Williams | 157/13 |
| 4,551,950 A | 11/1985 | Unno et al. | 451/5 |
| 4,603,514 A | 8/1986 | Suzuki et al. | 451/5 |
| 4,619,083 A | 10/1986 | Akabane et al. | 451/5 |
| 4,663,889 A | 5/1987 | Strand et al. | 451/5 |
| 4,669,228 A | 6/1987 | Rogers | 451/28 |

(Continued)

OTHER PUBLICATIONS

International Search Report from corresponding International (PCT) application No. PCT/US05/06377 mailed Sep. 28, 2005. Office Action mailed Oct. 24, 2007 in corresponding U.S. Appl. No. 11/508,390.

(Continued)

*Primary Examiner* — Dung Van Nguyen
(74) *Attorney, Agent, or Firm* — Renner, Kenner, Greive, Bobak, Taylor & Weber

(57) ABSTRACT

A grinding assembly contacts a tire supported by a frame relative to the tire. The grinding assembly includes at least one section, and an axial positioning assembly supporting the at least one section. The axial positioning assembly enables the at least one section to be axially repositioned relative to the tire. The at least one section includes a grinding head, where the grinding head includes a grindstone rotatably supported thereon, the grindstone having rounded shoulders at its axial extremities. The grinding assembly further includes a radial positioning assembly supporting the grinding head for radial movement with respect to the tire.

10 Claims, 17 Drawing Sheets

U.S. PATENT DOCUMENTS

| | | | | |
|---|---|---|---|---|
| 4,736,546 A | 4/1988 | Ugo | ............................. | 451/254 |
| 4,924,842 A | 5/1990 | Rao et al. | .................. | 125/11.01 |
| 4,953,522 A | 9/1990 | Better | ...................... | 125/11.01 |
| 5,179,806 A | 1/1993 | Brown et al. | .................... | 451/5 |
| 5,307,854 A * | 5/1994 | Brewer | ......................... | 157/13 |
| 6,016,695 A | 1/2000 | Reynolds et al. | .............. | 73/146 |
| 6,334,808 B1 | 1/2002 | Tanaka | .......................... | 451/44 |
| 6,431,963 B1 | 8/2002 | Delmoro et al. | ............... | 451/49 |
| 6,620,030 B1 | 9/2003 | Delmoro et al. | ............... | 451/11 |
| 6,655,438 B2 * | 12/2003 | Trochon et al. | ............... | 157/13 |
| 6,786,800 B1 | 9/2004 | Delmoro et al. | ............... | 451/11 |
| 7,381,114 B2 * | 6/2008 | Poling et al. | .................... | 451/5 |

OTHER PUBLICATIONS

Response to Office Action of Oct. 24, 2007 as mailed Jan. 3, 2008 in corresponding U.S. Appl. No. 11/508,390.

Office Action mailed Dec. 16, 2009 in corresponding U.S. Appl. No. 12/004,813.

Response to Office Action of Dec. 16, 2009 as mailed Jan. 25, 2010 in corresponding U.S. Appl. No. 12/004,813.

Office Action mailed Apr. 29, 2010 in corresponding U.S. Appl. No. 12/004,813.

Response to Office Action of Apr. 29, 2010 as mailed Jun. 2, 2010 in corresponding U.S. Appl. No. 12/004,813.

\* cited by examiner

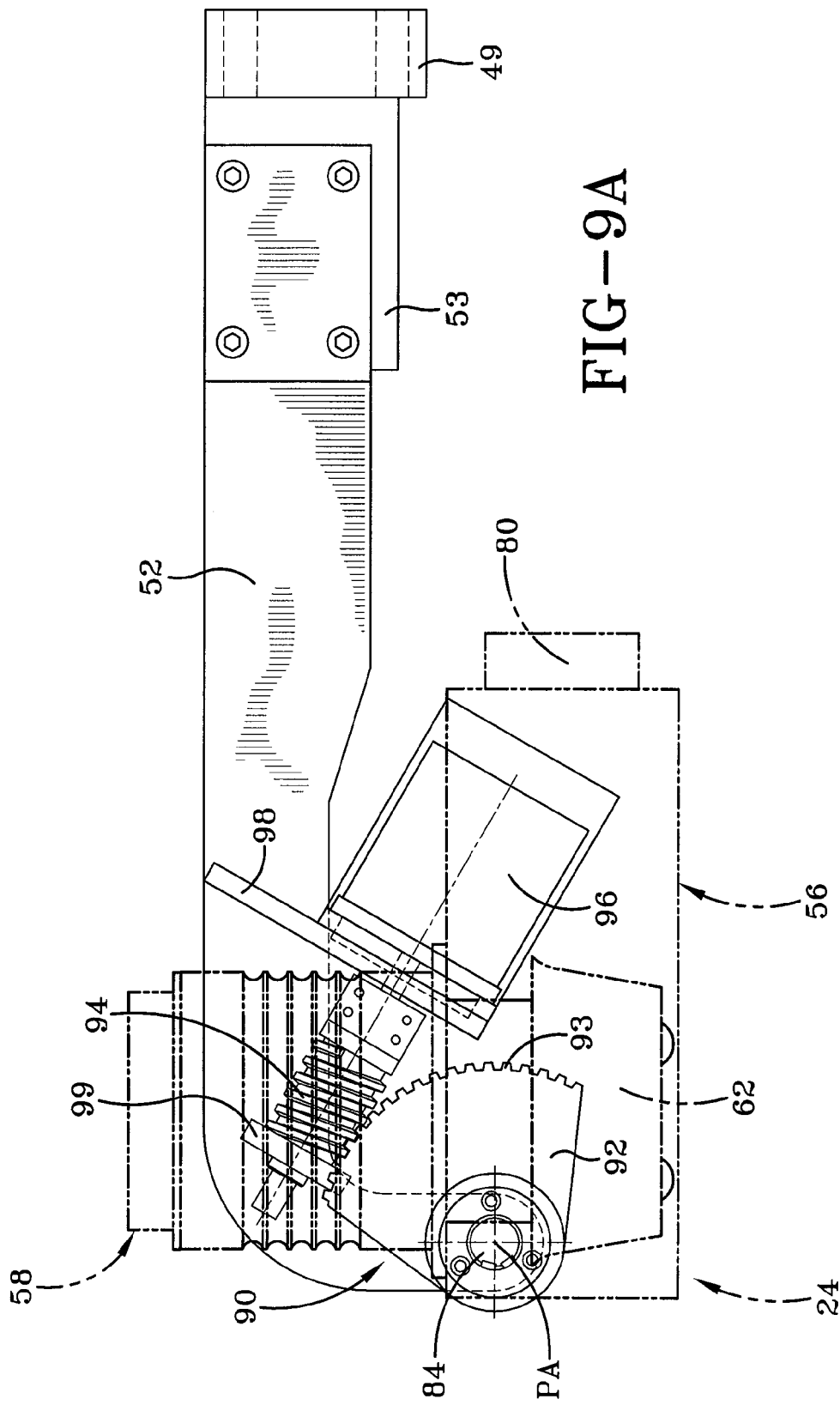

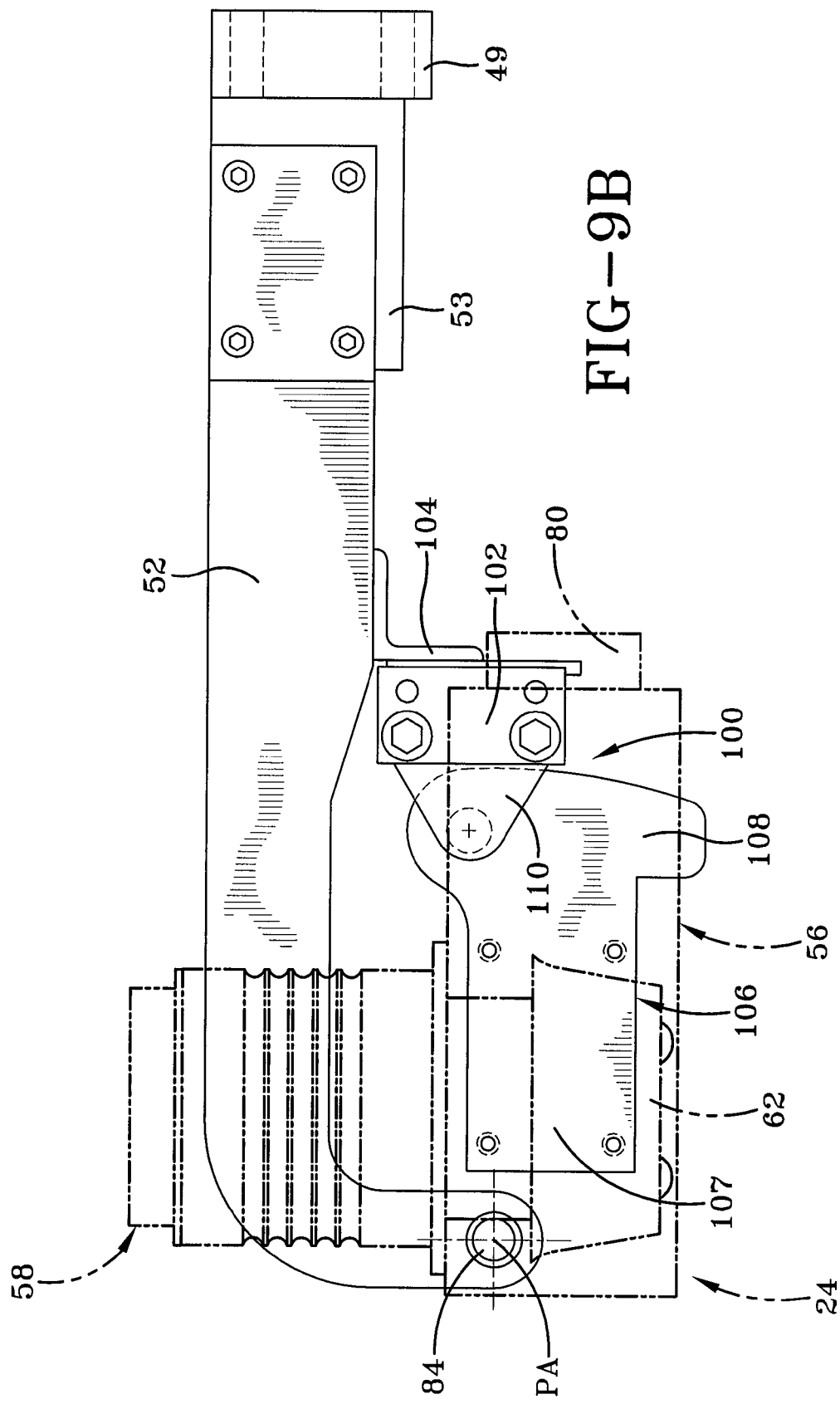

TIRE PROFILE GENERATING MACHINE AND RELATED METHODS

CROSS-REFERENCE TO RELATED APPLICATIONS

This application is a continuation-in-part of U.S. application Ser. No. 12/004,813 filed Dec. 20, 2007, now U.S. Pat. No. 8,157,613 which is a continuation-in-part of U.S. patent application Ser. No. 11/508,390 filed Aug. 22, 2006, and now U.S. Pat. No. 7,381,114 which is the national stage of International Application No. PCT/US05/06377 filed Feb. 28, 2005, which claims the benefit of U.S. Provisional Application No. 60/548,495 filed on Feb. 27, 2004, all of which are incorporated herein by reference.

TECHNICAL FIELD

In general, the present invention relates to a tire profile generating machine. More particularly, the present invention relates to a machine employing a grinding assembly having at least one grinding head capable of independent axial and radial movement with respect to a tire mounted on the machine. Most particularly, the present invention relates to a machine adapted to perform profile grinding so as to match a pre-determined tire profile.

BACKGROUND OF THE INVENTION

In tire uniformity machines, a tire is tested by rotating it at various speeds to ensure that the tire has been constructed to perform within quality control standards. During this testing process, the tire is rotated, and the tire uniformity machine examines the tire's integrity, shape, and surface qualities to a high degree of accuracy. At times, during examination, the tire uniformity machine detects irregularities in the tire. Any irregularity in the integrity, surface, and shape of the tire may be corrected by removing material from appropriate portions of the tire.

To remove material from a tire, known tire uniformity machines typically employ a grinder having a single grindstone rotating in relation to the rotation of the tire. In known grinders, the grindstone is cylindrical, and the application of the grindstone occurs in a rotary fashion. Often a motor and gear box arrangement is used to control the speed and direction of rotation of the grindstone. As such, the motor is connected to the gear box arrangement by belts or chains and a series of pulleys or sprockets. Because the motor needed to drive the belts or chains, and the gear box arrangement is bulky, the housing of the motor projects to such an extent that the confines of the tire uniformity machine prevent the grindstone from being actuated in a linear fashion inward and outward with respect to the tire. As such, to accommodate the limited area for positioning the grinder, known tire uniformity machines attach the motor distally from the grinder on the pivoting arm, away from the confines of the tire uniformity machine, so that rotation of the pivoting arm will position the grindstone adjacent the tire.

Rotation of the pivotal arm, however, may not aim the grindstone directly at the center of the tire. That is, the center line and the contact point of the grindstone travel in an arc in an attempt to tangentially contact the tire.

To better position the grindstone to remove material from the tire, known grinders pivotably support the grindstone relative to the pivoting arm. As such, the position of the grindstone can be pivoted to account for the indirect aim of the pivoting arm. To provide such pivotal movement, known grinders incorporate a series of linkages. In some cases, as many as five linkages may be used. Due to machining tolerances, each link is a potential source of error. When multiple links are used, such errors are compounded making it more significant in terms of accurately positioning the grindstone to remove material from the tire. Moreover, these linkages are susceptible to breakage resulting in machine downtime.

In fact, when dual grindstones, a leading and a trailing grindstone, are provided, use of such linkages virtually eliminate the ability of the grinder to have both grindstones strike the tire simultaneously, and, in some cases, may cause one of the grindstones to be out of contact with the tire. The trailing grindstone is often used in an attempt to correct irregularities created by the first grindstone. However, when errors occur using the linkages, the leading or trailing grindstone is precluded from performing its corrective function. As a result, further corrective grinding is required which significantly slows the grinding process.

As discussed above, the pivoting arm supporting single or dual grindstones can be a source of inaccuracy in positioning the grindstone or grindstones relative to the tire. Moreover, pivotably supporting the grindstone relative to the pivoting arm so that the grindstone or grindstones can be pivoted to account for rotation of the pivoting arm introduces additional inaccuracies. As such, there is a need for a grinder having single or dual grindstones repositionable with respect to a tire without using various linkages which can introduce inaccuracies during positioning. Such a grinder should be capable of initiating good, accurate contact of its grindstone or grindstones with the tire in a repeatable and much faster manner.

Existing tire uniformity machines make spot corrections by grinding selected portions of a tire for brief periods of time. To that end, shoulder grinders are used to contact the sidewalls of the tire, and a center grinder contacts the tread portion to grind off any imperfections detected during the testing process. The shoulder and center grinders are generally held in fixed vertical and angular positions and driven inward to contact the tire. In that regard, grinding is performed statically and movement of the grindstone while it is grinding is not contemplated. It is desirable to have a tire uniformity machine having a dynamic grinding assembly capable of automatically positioning the grindstone.

It is also desirable to compare a tire profile to a desired profile and remove selected tire material so as to accurately and quickly obtain the desired profile. Accordingly, it is desirable to actively monitor various parameters during the profiling process so as to ensure that the desired profile is attained.

SUMMARY OF THE INVENTION

In light of the foregoing it is a first aspect of the present invention to provide a tire profile generating machine and related methods.

In general, the present invention provides a grinding process for removing material from a tire including providing a grinding assembly having a grinding head having at least one grindstone rotatably supported thereon, the grinding stone having contoured shoulders at its axial extremities, the grinding head being movable axially and radially relative to the tire; providing actuators operatively connected to the grinding assembly to move the grinding head; providing a controller in communication with the actuators and at least one sensor; profiling the tire by contacting the grindstone to the tire to remove material from the tire and adjusting the position of the grindstone while it is in contact with the tire to define a selected profile.

BRIEF DESCRIPTION OF THE DRAWINGS

FIG. 9A is an enlarged side elevational view of FIG. 8 taken along Line 9A-9A depicting the tilt adjuster used to pivot the grinding head.

FIG. 9B is an enlarged side elevational view of FIG. 8 taken along Line 9B-9B depicting the braking assembly used in maintaining the pivotal position of the grinding head.

BEST MODE FOR CARRYING OUT THE INVENTION

A grinding assembly according to the present invention is generally referred to by the numeral 10 in the accompanying drawing figures. The grinding assembly 10 removes material from a tire T. The grinding assembly 10 may be used in association with tire machines in a lathe-like manner to remove material as the tire T rotates about a central axis CA. Optionally, grinding assembly 10 may be used in connection with a tire uniformity machine 1. Tire uniformity machines are well known, and thus, tire uniformity machine 1 will only be generally described. Tire uniformity machine 1 includes a frame F, which defines an area in which a tire T is received. A load wheel (not shown) is supported on frame F and brought into contact with tire T to perform testing. A grinding assembly 10 may be supported on frame F and is adapted to contact the tire T to remove material therefrom in a static manner, where the grinder is moved inward to contact a point on the tire or dynamically where the grinding assembly 10 contacts the tire T and then moves the grindstone automatically to perform additional grinding. Continuous movement of the grindstone may be made to perform profile grinding of the tire T. Thus, in this example, according to the concepts of the present invention, uniformity testing and profile grinding could be performed at a single location. It will be appreciated that when performing only grinding, the load wheel may be omitted and the tire rotated by a suitable drive assembly.

Figure 5:
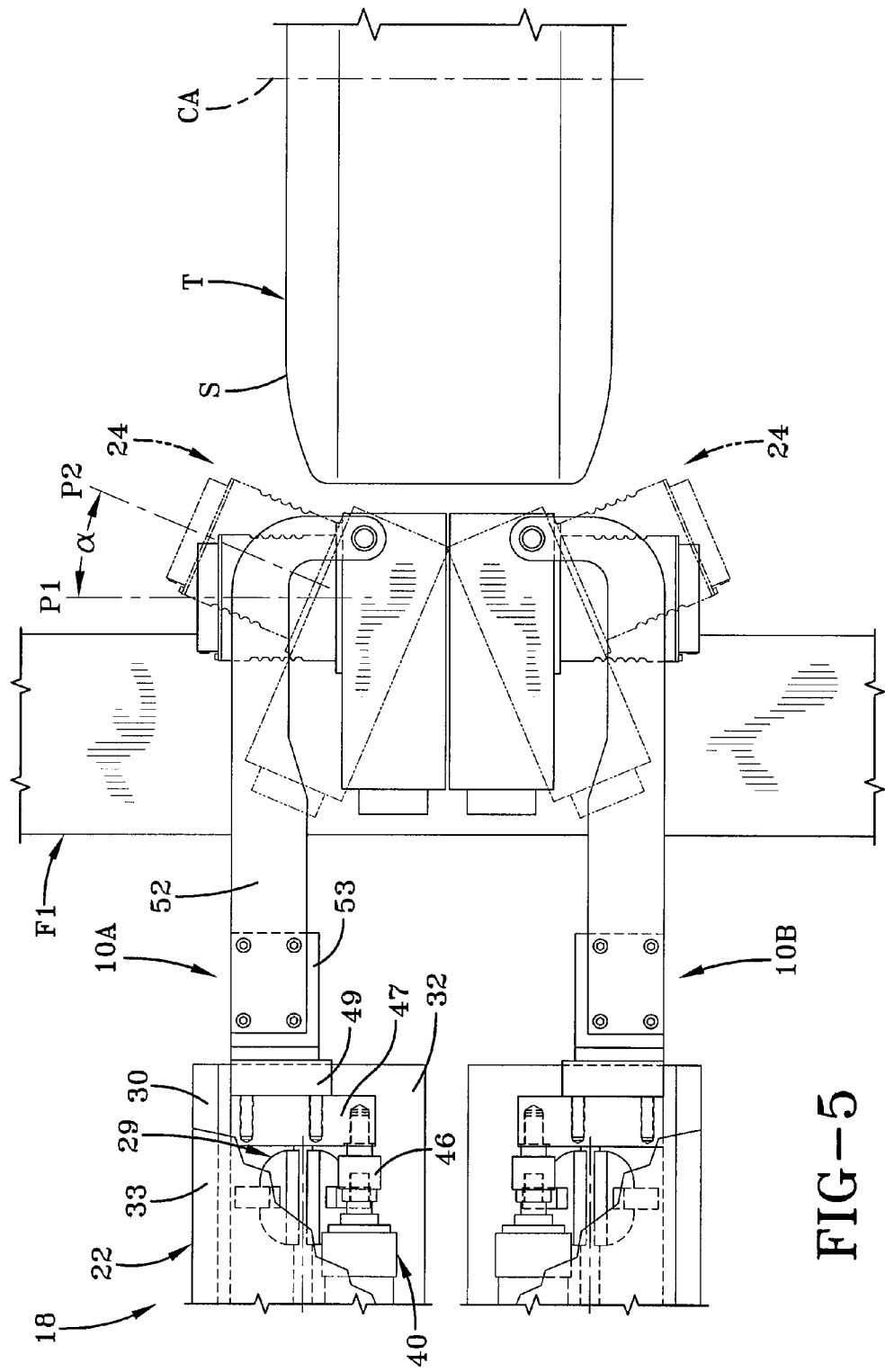
FIG. 5 is a side partially fragmentary elevational view of the upper section and lower sections of the grinding assembly positioned adjacent the tire depicting the pivotal positions of the grinding heads.

The grinding assembly 10 is suitably supported proximate to tire T to effect such contact, for example, by a frame F having frame members F1 and F2. The frame F may be an independent support, or be a part of the tire machine frame. As shown in FIG. 5, the grinding assembly 10 may include an upper section 10A and a lower section 10B. In the example shown, the upper section 10A and lower section 10B are mirror images, oppositely oriented with respect to one another, and, as discussed below, are capable of independent axial, radial, and pivotal movement with respect to the tire T.

The upper section 10A and lower section 10B are capable of independent axial movement along rails 12 and 14 using various actuators. As discussed below, the upper section 10A and lower section 10B are axially positionable with respect to one another, and to the tire T. To that end, the upper section 10A and lower section 10B are supported by rail carriages R1 and R2, respectively, moveable along the rails 12 and 14. Using the various actuators, the rail carriages R1 and R2 allow the upper section 10A and lower section 10B, respectively, to be axially positioned along the rails 12 and 14.

Figure 10:
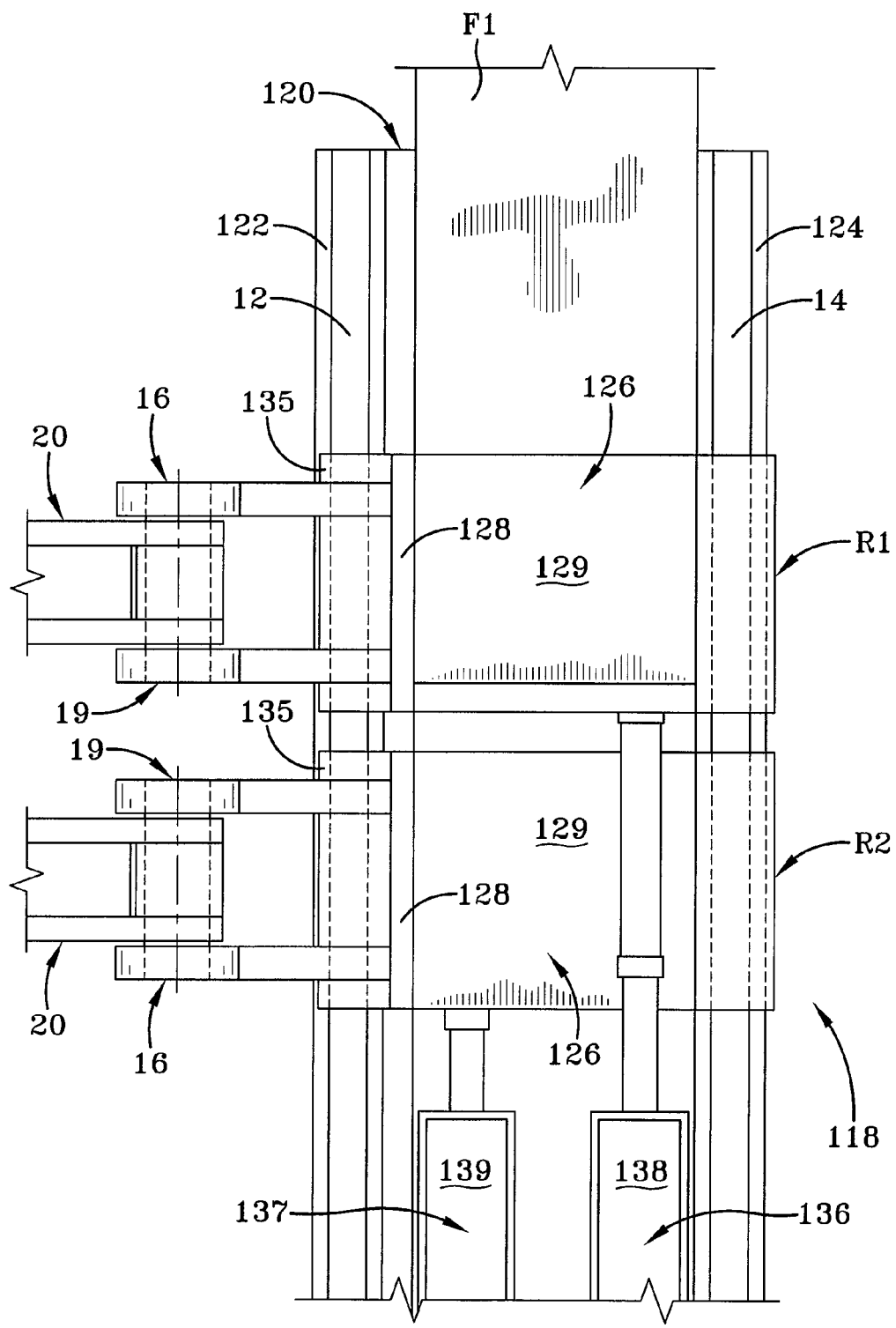
FIG. 10 is a side elevational view of FIG. 1 taken along Line 10-10 depicting the axial positioning assembly.

As shown in FIG. 10, the rail carriages R1 and R2 include collars 16 which support the upper section 10A and lower section 10B relative to the frame member F1. As discussed above, the upper section 10A and lower section 10B are mirror images of one another, and, therefore, include similar components. For sake of simplicity, the description will proceed with reference to the upper section 10A.

Figure 1:
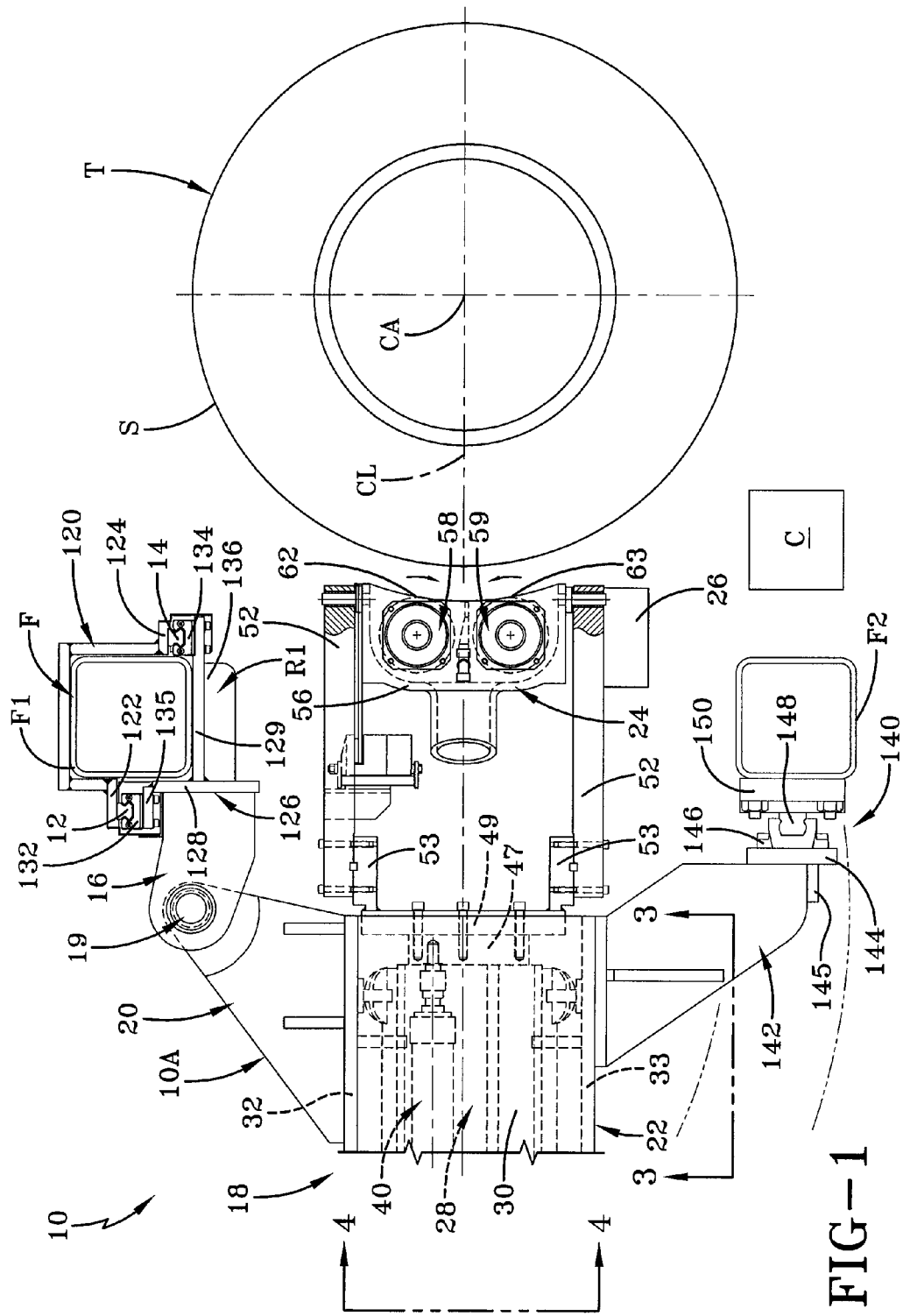
FIG. 1 is a plan view a grinding assembly according to the present invention employing an upper section and a lower section carrying grinding heads mounted thereon with the grinding assembly mounted to the frame of a tire uniformity machine.
Figure 2:
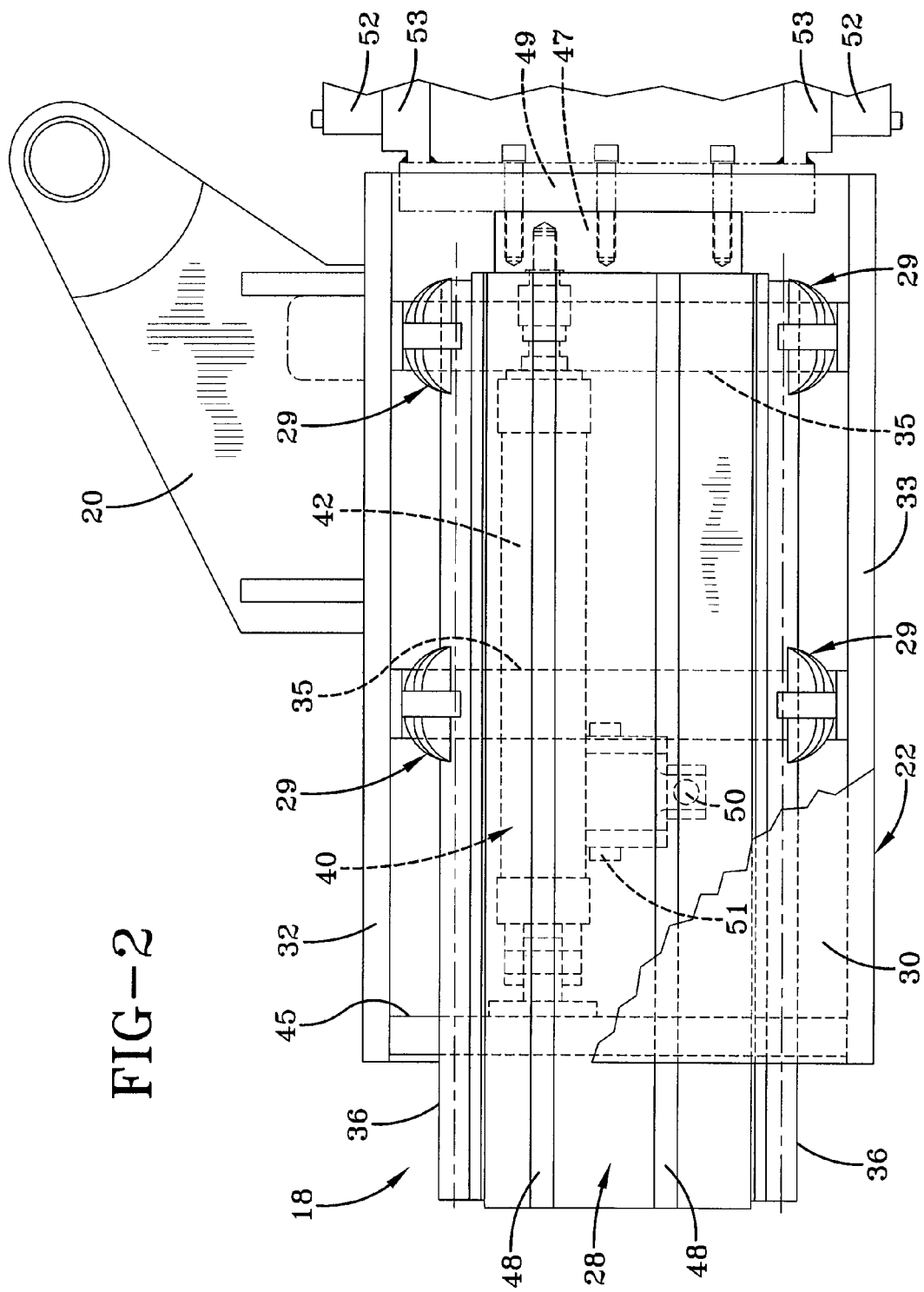
FIG. 2 is an enlarged plan view of FIG. 1 depicting the upper section of the grinding assembly having a carriage supporting an arm moveable in a radial direction with respect to a tire.
Figure 3:
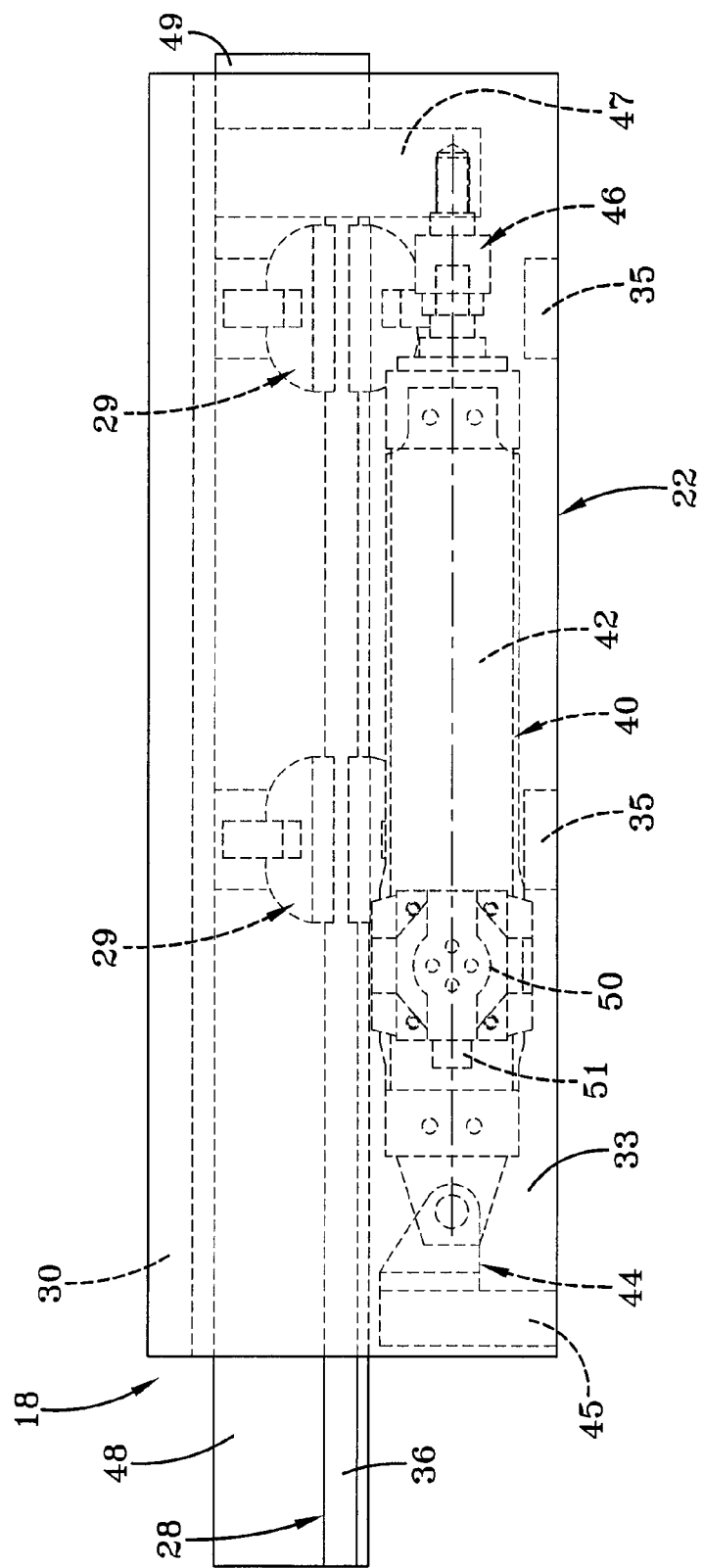
FIG. 3 is a side elevational view of the carriage of the upper section taken along Line 3-3 of FIG. 2.
Figure 4:
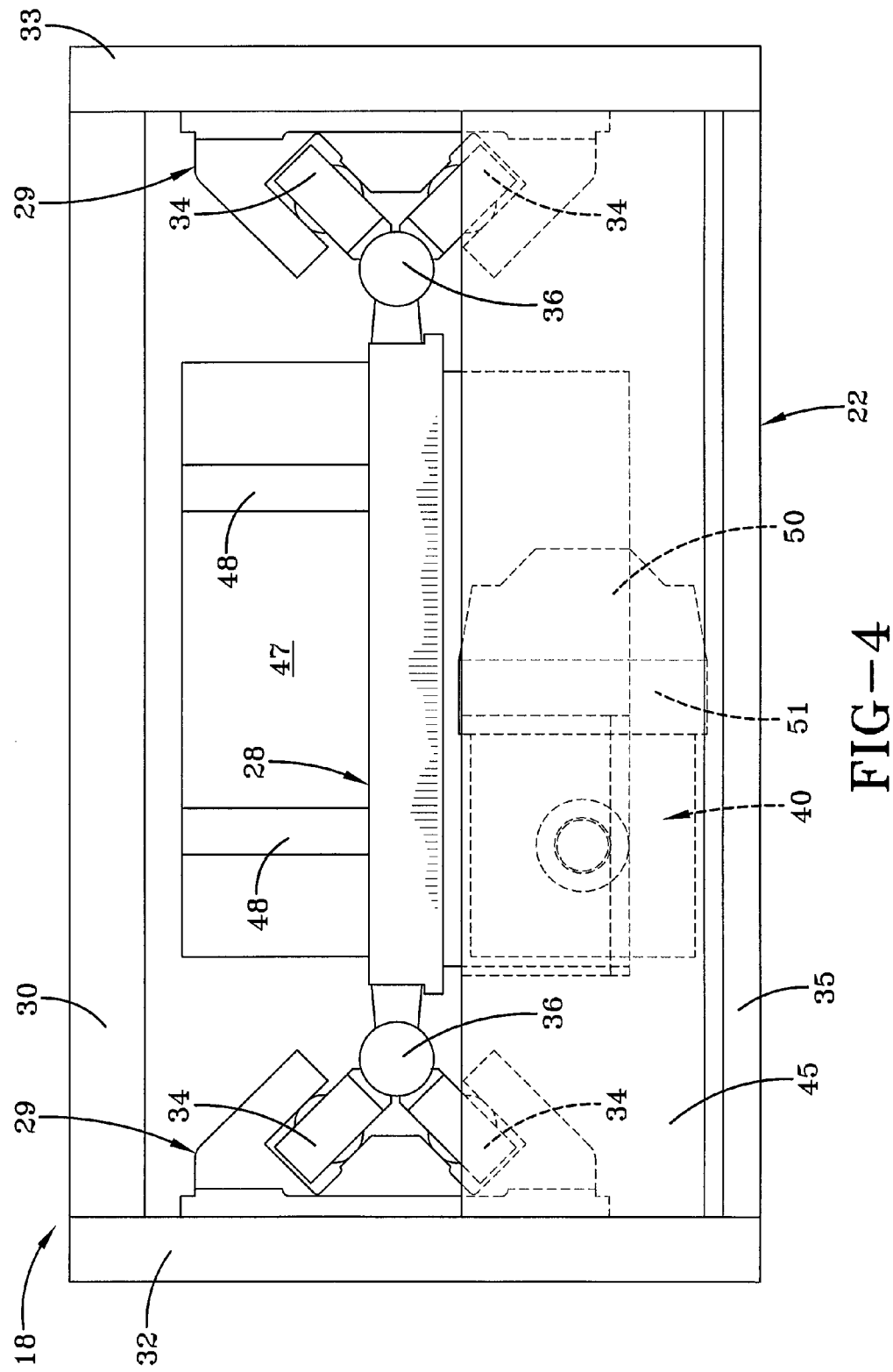
FIG. 4 is a rear elevational view of the carriage of the upper section taken along Line 4-4 of FIG. 2.

As best shown in FIGS. 2-4, the upper section 10A includes a radial positioning assembly, generally indicated by the numeral 18, that may be pivotably attached at 19 to the rail carriage R1 by a bracket 20. Pivotal attachment of the upper section 10A to the rail carriage R1 allows the upper section 10A to be moved from a service position to an engaged position (FIG. 1). In the service position, the upper section 10A is pivoted away from the tire uniformity machine to allow access to its various components. In the engaged position, as shown in FIG. 1, the upper section 10A is pivoted toward the tire uniformity machine, and the center line CL of the radial positioning assembly 18 is aligned with the central axis CA of the tire T. Linear movement of the grinding head 24, thus, occurs along a radial line extending from the central axis CA of the tire T.

To that end, the radial positioning assembly 18 includes a carriage 22 supporting a grinding head 24, while allowing linear movement thereof, for inward and outward radial movement relative to the tire T. As such, the carriage 22 may be fixed relative to the frame F, capable of radially positioning the grinding head 24 with respect to the tire T to effectuate contact of grindstones carried by the grinder head 24 with the surface S. When two grindstones are used, the alignment of the center line CL of the radial positioning assembly 18 with the central axis CA of the tire T allows the grindstones carried by the grinding head 24 to contact the surface S simultaneously.

As best shown in FIGS. 2-4, the carriage 22 carries a moveable arm 28 on which the grinding head 24 may be mounted. The moveable arm 28 is supported by bearings 29 that facilitate substantially linear movement of the moveable arm 28 inward and outward relative to the tire T. The carriage 22 includes a base plate 30, a first wall 32 and a second wall 33 which define an inverted U-shaped cavity for accommodating the moveable arm 28. Spacers 35 may be attached between the first wall 32 and second wall 33 opposite the base plate 30 to maintain the spacing therebetween.

The moveable arm 28 is supported between the first and second walls 32 and 33 by the bearings 29 attached to these walls. The bearings 29 may be linear bearings that may include rollers 34 suitably mounted on the carriage 22. The rollers 34 receive edges 36 of the moveable frame 28 to enable substantially linear movement of the moveable arm 28. As best shown in FIG. 2, four sets of bearings 29, two in an aft position and two in fore position, are provided to support the movement of the moveable arm 28 upon its actuation.

The moveable arm 28 is actuated by a suitable actuator generally referred to by the numeral 40, including fluid driven linear actuators, such as, hydraulic or pneumatic cylinders, motor driven actuators, electric actuators and the like. In the embodiment shown, actuator 40 includes a cylinder 42 that extends to drive the moveable arm 28 toward the tire T and retracts to pull the movable arm 28 away from the tire T.

The one end 44 of the actuator 40 is fixedly attached to an end plate 45 extending between the first and second walls 32 and 33 of the carriage 22. The other end 46 of the actuator 40 is extendable and retractable, and is attached to a junction plate 47 connected to the moveable arm 28. The junction plate 47 is perpendicularly oriented with respect to the moveable arm 28, and includes portions extending above and below the moveable arm 28. The end 46 of the actuator 40 is attached to the portion of the junction plate 47 extending below the moveable arm 28, and the portion of the junction plate 47 extending above the moveable arm 28 is reinforced by struts 48 attached thereto that extend longitudinally along the moveable arm 28.

As discussed above, the manipulation of radial positioning assembly 18 may be controlled by the system controller C. For example, a hydraulic, electric, or cylinder 42 is employed to extend and retract the moveable arm 28 carrying the grinder head 24. As such, supply lines (not shown) carrying fluid from a fluid supply may used to selectively direct fluids to the cylinder 42 to apply a motive force. To control the flow of such fluid, a servo valve 50 may be used to meter the fluid passing through a manifold 51 supplying the cylinder 42. In the case of an electric actuator, an electronic servo drive is used. A system controller C (not shown) may be used in controlling the radial positioning assembly 18 to adjust inward and outward radial movement of the grinding head 24 relative to the T. The system controller C can incorporate appropriate sensors for determining the position of the upper section 10A relative to the tire T. For example, a sensor 26 is mounted on the upper section 10A adjacent to the grinding head 24 in sensing relation to the tire T. The sensor 26 communicates with the system controller C to allow the radial position of the grinding head 24 with respect to the tire T to be accurately controlled.

Using the servo valve 50, the activation of the cylinder 42 may be coordinated by the system controller C via signals provided by the sensor 26. The system controller C can activate and deactivate operation of the servo valve 50 to extend and retract the moveable arm 28 so the radial position of the grinding head 24 can be controlled.

Figure 8:
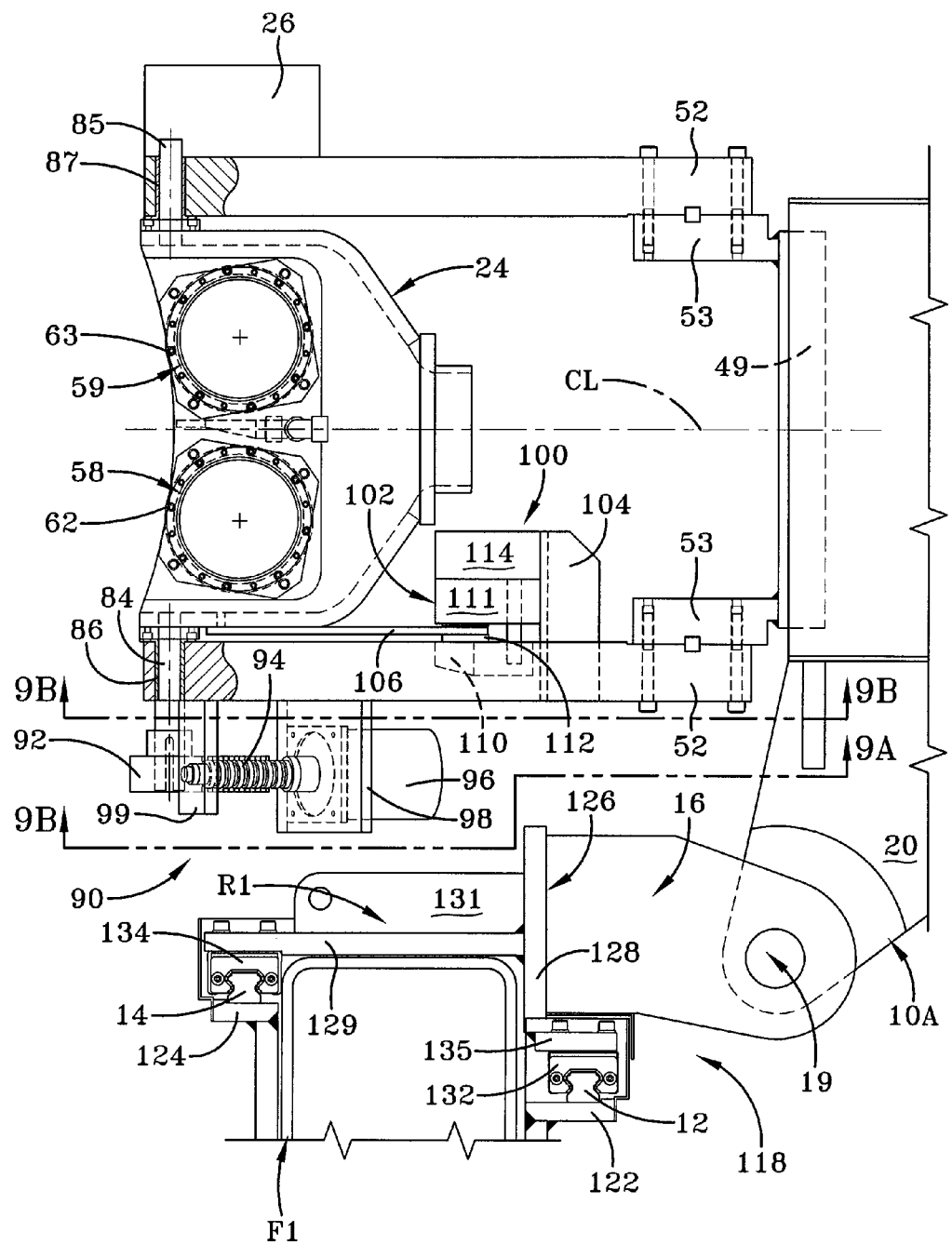
FIG. 8 is an enlarged plan view of FIG. 1 depicting a tilt adjuster used to pivot the grinding head, a braking assembly used in maintaining the pivotal position of the grinding head, and an axial positioning assembly used in adjusting the axial position of the upper section and lower section.

As shown in FIGS. 1 and 8, the grinder head 24 is supported relative to the moveable arm 28 by a pair of extension arms 52. The extension arms 52 are attached via offset brackets 53 to an attachment beam 49 fastened to the upper portion of the junction plate 47. The extension arms 52 extend outwardly from the offset brackets 53 toward the tire T, and may be generally L-shaped to define a clearance that allows pivotal movement of the grinding head 24. The grinding head 24 is supported between the distal ends of the extension arms 52.

The grinding head 24 may include a shroud or housing 56 supporting a first motor 58 and a second motor 59 which have grindstones 62 and 63, respectively, attached thereto. The shroud 56 includes an upper wall 64, a lower wall 65, and side walls 66 and 67 extending between the upper wall 64 and lower wall 65 from the front to the rear of the shroud 56 to define a grinding chamber 70. As shown in FIG. 7, the shroud 56 defines a front opening 72 to provide access to the grinding chamber 70. Furthermore, the upper wall 64 and lower wall 65 are curved (FIG. 6) along their front edges adjacent the front opening 72 to accommodate the annularity of the tire T.

As shown in FIG. 7, the first and second motors 58 and 59 are secured to the upper wall 64, and include shafts 74 and 75, respectively, extending therethrough to rotatably support the grindstones 62 and 63 within the grinding chamber 70. As such, each of the grindstones 62 and 63 may be driven directly by motors 58 and 59 located adjacent each grindstone 62 and 63. By using a single motor for each of the grindstones 62 and 63, the size of the motors 58 and 59 in such a directly driven system are reduced. Moreover, when the grindstones 62 and 63 are driven directly, the inertia of the directly driven system is reduced in comparison to known systems incorporating a motor located distally from the grindstones with a series of belts or chains connecting the motor with a gear box arrangement for rotating the grindstones. The reduced inertia of a directly driven system improves the rate at which the reversal of the grindstones 62 and 63 can be initiated. By reversing the grindstones 62 and 63 quickly from one direction to another, the directly driven system may significantly reduce processing time when such reversal is necessary. Motors 58 and 59 are sized to drive the grindstones 62, 63 with sufficient power yet are compact to allow free movement within the machine proper, wherein the tire T is located. Power to the motors 58 and 59 is supplied conventionally by electrical cables (not shown) which may be connected to the motors 58 and 59 at a junction box (not shown). Furthermore, to protect the components of the motors 58 and 59, housings 76 are provided to substantially cover the exposed surfaces of the motors 58 and 59.

Figure 6:
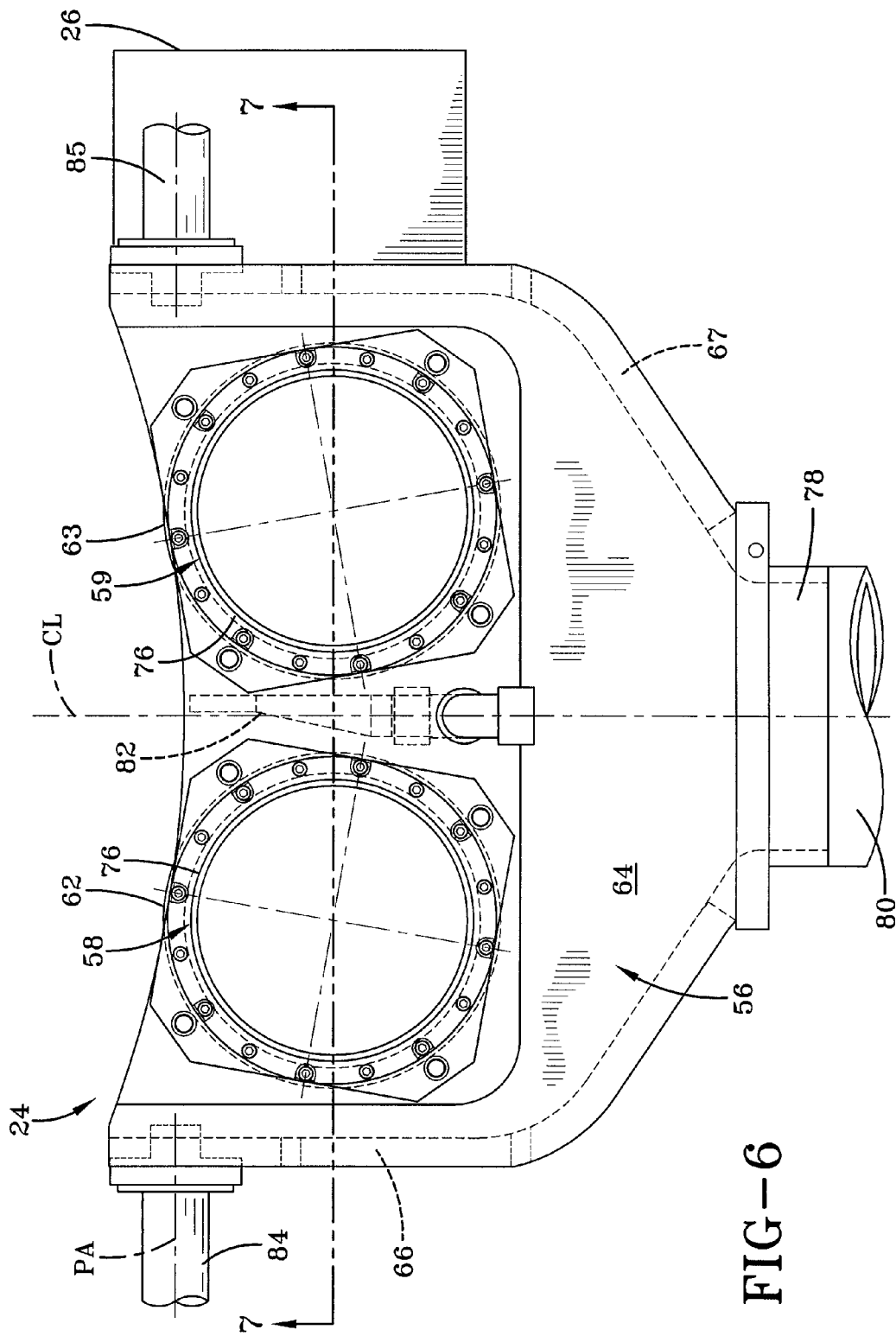
FIG. 6 is an enlarged plan view of FIG. 1 depicting the grinding head of the upper section of the grinding assembly.
Figure 7:
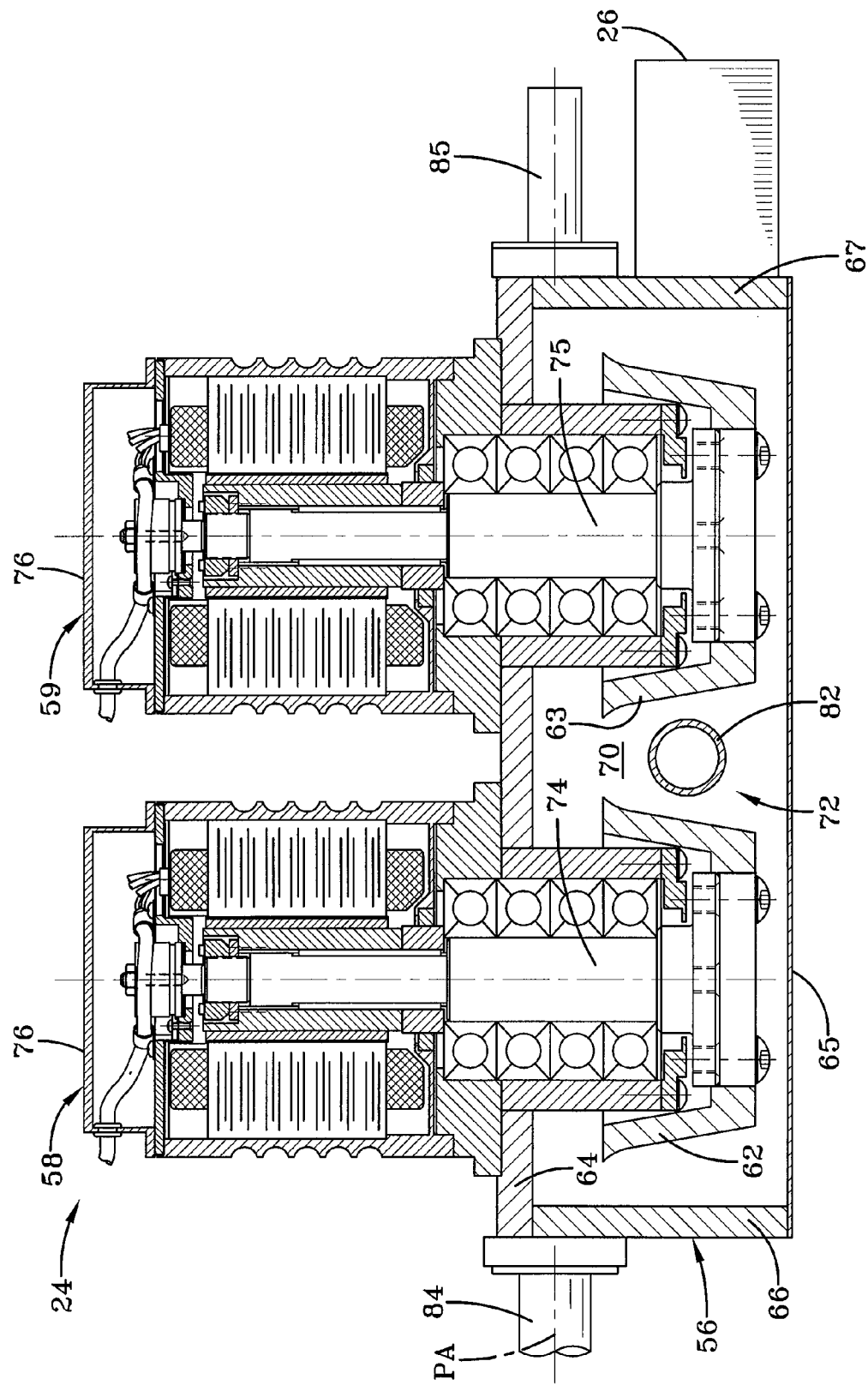
FIG. 7 is cross-sectional view of the grinding head taken along Line 7-7 of FIG. 6 depicting grindstones driven by the grinding head positioned within a grinding chamber.

As shown in FIGS. 6 and 8, the shroud 56 may be provided with a nozzle 78 attached to a vacuum source open to grinding chamber 70 to remove particulate created during the grinding process. For example, the side walls 66 and 67 curve toward one another at the rear extremity of the shroud 56 to define, together with the upper wall 64 and lower wall 65, the nozzle 78. As such, the nozzle 78 is integrally formed with the shroud 56, and fluidly connected to the vacuum source by a hose 80.

To further aid in the removal of particulate, a jet nozzle 82 may direct a supply of fluid, such as air, toward the tire T to attempt to expel particulate lodged along the surface S at the treads, sidewall, or the shoulder. The jet nozzle 82 is fluidly connected to a supply of air distally located away from the grinding head 24. The jet nozzle 82 may be located inside the grinding chamber 70 near the grindstones 62 and 63. In fact, as shown in FIG. 7, the jet nozzle 82 may be located between the grindstones 62 and 63 within the vacuum stream created by the vacuum source.

The sensor 26 may be mounted on the shroud 56 or proximate thereto to determine the position of the upper section 10A, and, specifically, the grinding head 24 relative to the tire T, and to measure the amount of material removed from the tire T during the grinding process. As discussed above, the sensor 26 communicates with the system controller C to the radial position of the moveable arm 28.

The system controller C extends the moveable arm 28 to position the grinding head 24, and, hence, the grindstones 62 and 63 carried thereby adjacent the tire T. In this way, the radial positioning assembly 18 can be used to simultaneously place the grindstones 62 and 63 into contact with the surface S of the tire T. Once in contact with the surface S, the leading grindstone 62 and trailing grindstone 63, as defined by the rotational direction of the tire T depicted in FIG. 1, can remove material from the tire T in consecutive fashion. The grindstones 62 and 63 may rotate in the same direction about their respective axes of rotation or they may rotate in opposite directions with respect to each other. For example, as shown in FIG. 1, the leading grindstone 62 may rotate in a clockwise direction and the trailing grindstone 63 in a counterclockwise direction. As such, the leading grindstone 62 may remove the bulk of the material with the trailing grindstone 63 removing irregularities created by the leading grindstone 62. Once sufficient material is removed from the tire T, the system controller C retracts the moveable arm 28 to pull the grindstones 62 and 63 away from the tire T. If the axes of the grindstones are laterally aligned with respect to each other, such as shown in FIG. 6, the grindstones 62 and 63 are generally withdrawn from the surface S of tire T simultaneously.

To perform grinding along the surface S at the treads, sidewall, or shoulder, the grinding head 24 including the shroud 56, motors 58 and 59, and grindstones 62 and 63 may be made pivotable about a pivot axis PA. For example, the shroud 56 may be attached to the extension arms 52 by pivot shafts 84 and 85 located on the side walls 66 and 67, respectively. As best shown in FIG. 7, the pivot shafts 84 and 85 are attached to the side walls 66 and 67, respectively, generally near the upper wall 64. The pivot shafts 84 and 85 are partially rotatable within apertures 86 and 87 (FIG. 8), respectively, provided through the extension arms 52 about the pivot axis PA. As such, the grinder head 24 can be pivoted from a position P1 to a position P2 (FIG. 5) through angle α to position the grindstones 62 and 63 to contact the treads, sidewall, or shoulder along the surface S of the tire T.

A tilt adjuster assembly 90 provides for automated pivotal movement of the grinding head 24 about the pivot axis PA. Generally, the angular position of grinding head 24 is controlled by an actuator, such as, a cylinder, motor, or other available device capable of causing the grinding head 24 to rotate about pivot axis PA. In the example show, in FIG. 9A, the tilt adjuster assembly 90 may include a pie-shaped gear section 92 rotatably fixed to the pivot shaft 84. The pie-shaped gear section 92 includes teeth 93 along the outer edge thereof provided to interface with a worm gear 94. The worm gear 94 is formed on or attached to the shaft of a motor 96, which may be a servo motor, attached to the extension arm 52. For example, the motor 96 may mounted to the extension arm 52 by a bracket 98 extending outwardly therefrom. Furthermore, the shaft of the motor 96 may be supported by a bracket 99 including a bearing or a bushing (not shown). The bracket 99 also extends outwardly from the extension arm 52 so that the worm gear 94 can be positioned to abut the pie-shaped gear section 92. As such, rotation of the worm gear 94, in both clockwise and counter-clockwise directions, is translated by the pie-shaped gear section 92 into pivotal movement of the shaft 84, and, hence, the grinding head 24.

Again, the system controller C can be used to operate the tilt adjuster 90 to control pivotal movement of the grinding head 24, and, hence, the grindstones 62 and 63 carried thereby. As such, the angular orientation of the grindstones 62 and 63 can be adjusted to ensure proper contact with the surface S along the treads, sidewall, and shoulder. To that end, the sensor 26 may be used to determine the position of the upper section 10A, and, specifically, the grinding head 24 relative to the tire T so that tilt adjuster 90 can be activated accordingly. Moreover, feedback from the motor 96 may be used to determine the angular position of grinding head 24, for example, motor 96 may include an encoder or similar device.

To hold the grinding head 24 in a selected position, a braking assembly 100 may be provided. The braking assembly 100 includes a brake 102, which, in order to gain mechanical advantage, may be placed distally of the pivot axis PA. As shown in FIG. 9B, the brake 102 is attached to the extension arm 52 using an L-shaped bracket 104 adjacent the rear extremity of the shroud 56. It will be appreciated that a braking assembly may not be necessary, when using a cylinder or servo motor to tilt the grinding head 24. Therefore, the braking assembly 100 may be omitted or used to reinforce the braking force applied by the actuator.

In the example shown, the brake 102 is used to apply a clamping force to a braking member 106 attached to the shroud 56. As shown in FIG. 9B, the braking member 106 is formed as a somewhat hatchet-shaped member with a body 107 secured to the grinding head 24, and an arc-shaped extension 108. The body 107 extends from the shroud 56 toward the brake 102, and the arc-shaped extension 108 is received within the brake 102. To permit braking at any angular position, the length of the arc-shaped extension 108 is determined by the desired degree of tilt of the grinding head 24, or, in other words, the desired amount of pivot movement.

The brake 102 includes a brake aim 110 moveable in and out relative to a block 111. The arc-shaped extension 108 is received between the brake arm 110 and block 111, and inward movement of the brake arm 110 clamps and outward movement of the brake arm 110 unclamps the arc-shaped extension 108 against the block 111. If necessary, the brake arm 110 and/or block 111 can include a brake pad 112.

A motor 114 may be positioned adjacent the brake 102 to actuate the brake 102, and move the brake arm 110 inwardly and outwardly relative to the block 111. As such, when the motor 114 is activated to move the brake arm 110 inwardly to clamp the arc-shaped extension 108 within the brake 102, the position of the grinding head 24 may be reinforced. Moreover, activation of the motor 114 can be controlled by the system controller C according to operation of the tilt adjuster 90.

As discussed above, the upper section 10A and lower section 10B may move independently of one another. As such, in addition having grinding heads 24 capable of radial and pivotal movement relative to the tire T, the grinding heads 24 located on the upper section 10A and lower section 10B can adjusted axially with respect to the tire T. To that end, the upper section 10A and lower section 10B are capable of axial movement using an axial positioning assembly 118. The axial positioning assembly 118 incorporates the rail carriages R1 and R2 supporting the upper section 10A and lower section 10B, respectively, and the rails 12 and 14.

As shown in FIG. 10, the rails 12 and 14 extend axially along the frame member F1. The rails 12 and 14 may be attached to the frame member F1 using an attachment saddle 120 incorporated in the axial positioning assembly 118 that extends axially along the frame member F1. The attachment saddle 120 is secured to the frame member F1, and includes extension brackets 122 and 124 extending outwardly therefrom to support the rails 12 and 14, respectively.

The rails 12 and 14 moveably support the rail carriages R1 and R2, and, as discussed above, allow the upper section 10A and lower section 10B to be axially positioned with respect to one another, and to the tire T. For example, the positions of the rail carriages R1 and R2 along the rails 12 and 14 provide for the positions of the upper section 10A and lower section 10B with respect to one another. As shown in FIG. 10, the rail carriage R1 is supported at an upward axial position to support the upper section 10A, and the rail carriage R2 is supported at a downward axial position to support the lower section 10B.

The rail carriages R1 and R2 each include a body 126 having a T-shaped cross-section formed by a first plate 128 and a second plate 129 perpendicularly attached along one edge to the first plate 128. The first and second plate 128 and 129 extend axially along a corner 130 of the frame member F1 and support rail blocks 132 and 134 which receive the rails 12 and 14, respectively. Furthermore, as discussed below, the rail carriage R1 includes a ledge 131 or other member for accommodating one of the various actuators. The ledge 131 may, for example, extend outward along the bottom edge of the second plate 129.

As best shown in FIG. 8, the rail block 132 receiving the rail 12 may be attached via a bracket 135 along an edge of the first plate 128. Furthermore, the rail block 134 receiving the rail 14 may be attached to the second plate 129 adjacent the edge opposite the edge attached to the first plate 128. The rail blocks 132 and 134 are moveable along the rails 12 and 14, respectively, and allow the rail carriages R1 and R2 to be axially positionable with respect to one another, and to the tire T.

As discussed above, various actuators are used to move the upper section 10A and 10B along the rails 12 and 14 and may be used to mold the halves in selected axial positions. More specifically, the axial positioning assembly 118 incorporates suitable linear actuators, generally referred to by the numerals 136 and 137, to actuate movement of the carriages R1 and R2, respectively. The actuators 136 and 137 can be fluid driven actuators, such as, hydraulic or pneumatic cylinders, motor driven actuators, electric actuators and the like. In the embodiment shown, the actuators 136 and 137 include cylinders 138 and 139 which extend to raise the carriages R1 and R2 and retract to lower the carriages R1 and R2.

The actuators 136 and 137 may both be fixedly attached at one end to the frame F, for example, adjacent the bottom of the frame member F1. The other end of the actuator 136 is attached to the carriage R1 and the other end of the actuator 137 is attached to the carriage R2. In the orientation shown, to avoid interference of the actuator 136 with respect to the lower carriage R2, the actuators 136, 137 may be offset from one another outwardly relative to the frame member F1. For example, actuator 136 may be located further outward from frame member F1 than actuator 137 a distance sufficient to allow actuator 136 to clear the carriage R2 to which actuator 137 is connected. The ledge 131 extends outwardly from the carriage R1 to facilitate contact with the outwardly offset actuator 136.

To attach the upper section 10A and lower section 10B to the rail carriages R1 and R2, respectively, the collars 16 are attached to the first plates 128 thereof. As such, the collars 16 extend outwardly from the first plates 128, and the extension brackets 20 attached to the carriages 22 (of the upper section 10A and lower section 10B) are pivotably received between the upper and lower collar arms 16A and 16B. As such, the actuators 136 and 137 can be actuated to move, without interference, the carriage R1 and the upper section 10A supported thereby and the carriage R2 and the lower section 10B supported thereby axially with respect to one another, and to the frame member F1.

Again, system controller C can be used to operate the axial positioning assembly 118 to control the axial positions of the upper section 10A and lower section 10B, and, hence, the grinding heads 24 and grindstones 62 and 63 carried thereby. As such, the axial orientation of the grindstones 62 and 63 of both grinding heads can be adjusted to ensure proper contact with the surface S along the treads, sidewall, and shoulder. To that end, the sensors 26 may be used to determine the position of the upper section 10A and upper 10B, and, specifically, the grinding heads 24 thereof relative to the tire T so that axial positioning assembly 118 can be activated accordingly.

Figure 11:
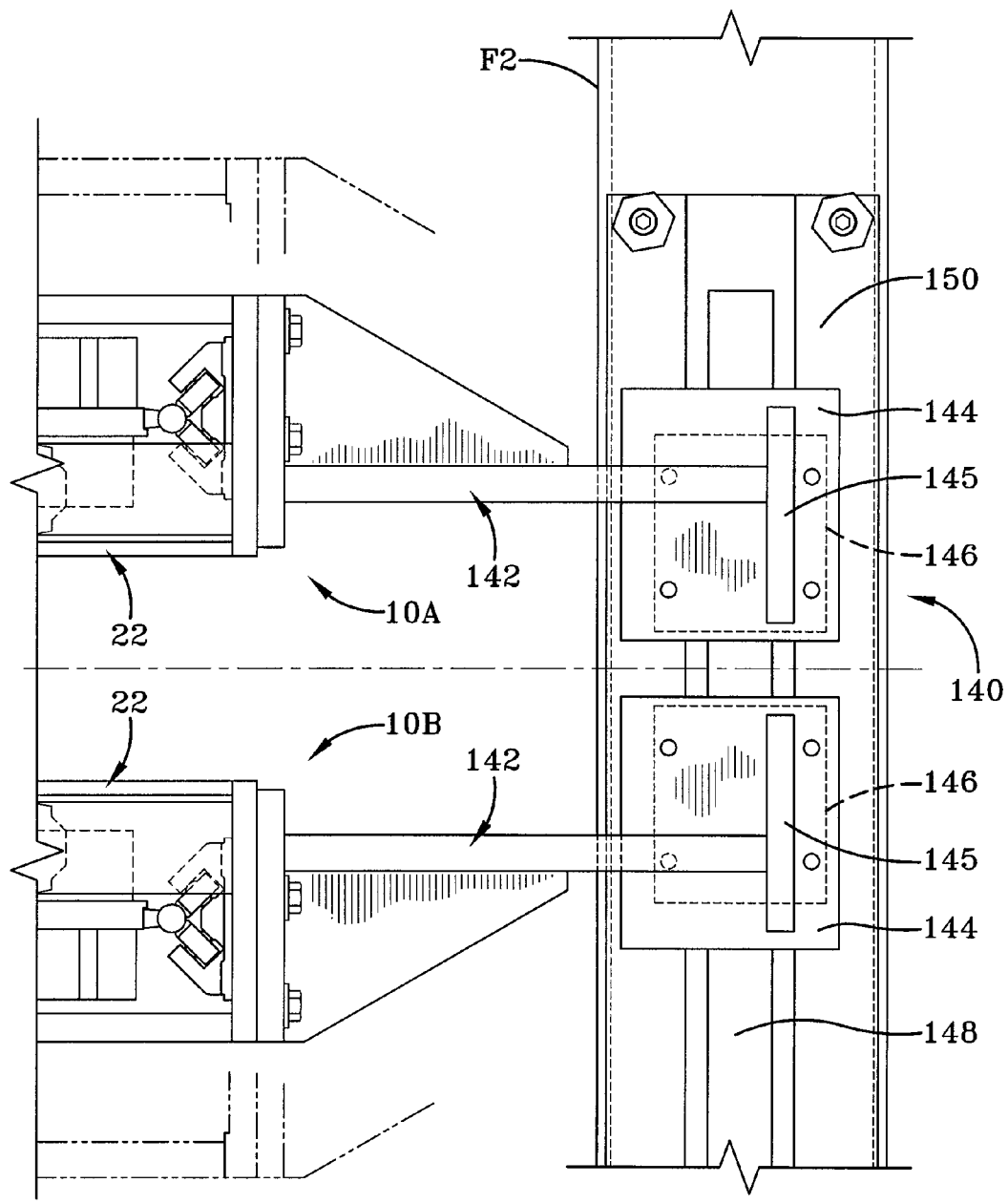
FIG. 11 is a side elevational view of FIG. 1 taken along Line 11-11 depicting an axial slide assembly.

An axial slide assembly 140 is provided along the frame member F2 to accommodate axial movement of the upper section 10A and lower section 10B using the axial positioning assembly 118. For example, as shown in FIG. 1, the extension brackets 142, like extension brackets 20, are attached to the carriages 22 of the upper section 10A and lower section 10B. The extension brackets 142 include, as shown in FIG. 11, support plates 144 attached thereto, and the attachment of the support plates 144 to the extension brackets 142 is reinforced with strengthening plates 145. The support plates 144 carry rail blocks 146 provided to receive a rail 148 attached to the frame member F2.

As shown, in FIGS. 1 and 11, the rail 148 is attached to a backing plate 150 that is secured to the frame member F2, and extends axially therealong. As such, when the upper section 10A and lower section 10B are in the engaged position (FIG. 1), the rail blocks 146 receive the rail 148. The rail blocks 146 slidably engage the rail 148, and allow the axial slide assembly to accommodate axial movement of the upper section 10A and lower section 10B with respect to one another, and to the tire T, while providing support relative to the frame member F2.

As described above, the grinding head 24 may be made to move axially, radially, and angularly about a pivot axis PA in an automated fashion. Consequently, the grinding assembly 10 may be used to grind the entire profile of the tire T. While, a description has discussed one example, where two arms 10A, 10B carry grinding heads 24, it will be appreciated that a single arm and grinding head may be used. When using multiple arms 10, movements of the arms 10 may be coordinated with each other to achieve the desired grinding and avoid interference with each other. For example, grinding assemblies 10A, 10B may be programmed to start substantially next to each other and centrally relative to the axial dimension of the tire to calibrate a central set point for the grinding assemblies 10A, 10B. Each grinding assembly 10A, 10B would then move outwardly from the central set point to perform the necessary grinding. Dynamic adjustment of the grinding head 24 may be made based on feedback from sensors, such as, sensor 26 or other sensors used in connection with the tire machine. For example, in a tire uniformity machine, the various sensors used in measuring the dimensions of the tire and forces generated thereby may be used to control movement of the grinding head 24 and perform selected grinding at selected locations on the tire T.

When using the system controller C to control the axial, radial, and angular position of the grinding head 24, highly automated and accurate operation is possible. Also, the system controller C may be programmed or otherwise provided with the instructions necessary to create a selected tire profile. This profile could be stored in memory within the system controller C and recalled whenever a tire of the same type is processed. The system controller C would then formulate a set of instructions from the profile information to control the position of the grinding head 24 and produce the desired profile. When incorporated in a tire uniformity machine, the grinding assembly 10 may be used to provide profile grinding in addition to force and run-out grinding.

Figure 12:
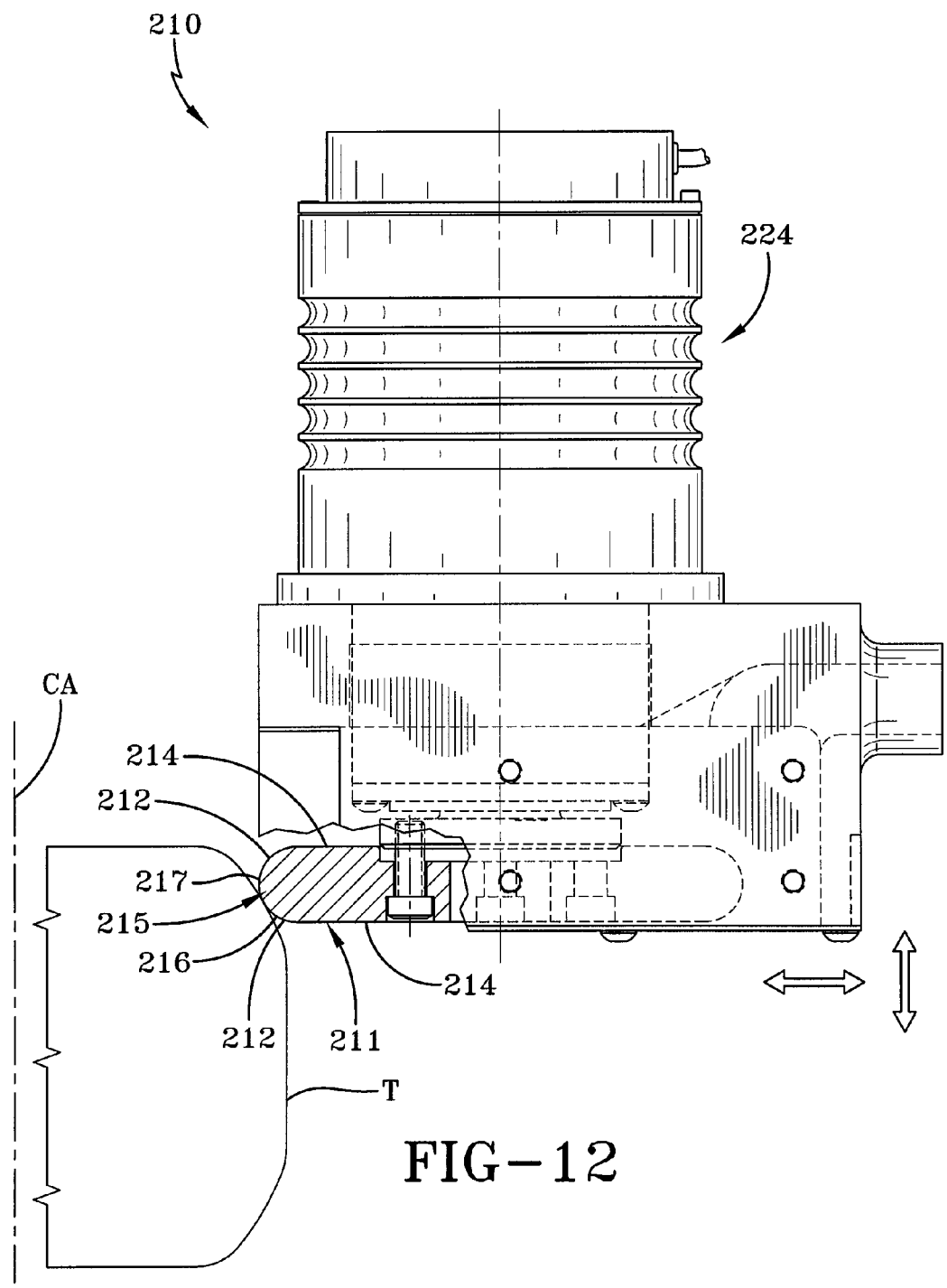
FIG. 12 is a side elevational view of an alternate grinder according to the concepts of the present invention partially sectioned to show details of grindstone.

An alternate grinding assembly according to the concepts of the present invention is depicted in FIG. 12 and generally referred to by the number 210. Grinding assembly 210 is similar to grinding assembly 10 described in detail above, and generally includes a grinding head, generally indicated by the number 224 that supports a grindstone and is moveable axially and radially to contact the tire T and remove material therefrom. Grinding assembly 210 includes an alternate grindstone, generally indicated by the number 211 specially designed for lathe-like profile grinding. Grindstones 62, 63, described above, while capable of performing profile grinding, are best suited for force and run-out grinding, where the tire uniformity machine moves the grindstone to a fixed position to remove a selected amount of material and then retracts the grindstone. To perform profile grinding in a lathe-like manner, the grindstone continues to move along the surface of the tire T after initial contact. To that end, grindstone 211 differs from grindstones 62, 63 in that it has at least one rounded shoulder 212 at an axial extremity 214 of the grinding surface 215. When grinding in one direction relative to the tire's axis CA, rounded shoulder 212 may be provided on the leading side 216 of grindstone 211, or when grinding in either direction relative to the tire's axis CA, a pair of rounded shoulders 212 may be provided at the upper and lower axial extremities of grindstone 211. By rounding shoulders 212, the grindstone 211 may move while in contact with tire T, and is less prone to catching on tire T than the square shouldered stones found in the art. As shown, shoulders 211 may be rounded to give the grindstone 212 a generally semi-circular outer profile 217. Rounded shoulders 212 allow grindstone 211 to move axially and radially while maintaining contact with the tire T. In this way, grindstone 211 makes lathe-like cuts on tire T. As in the case of grindstones 62, 63, a pair of grindstones 211 may be used in tandem to reduce the likelihood of cupping.

Also, while a single grinding assembly 210 may carry grindstone 211, plural grinding assembly sections, such as sections 10A and 10B described in detail above, may each carry a grindstone 211. As previously discussed, when using plural sections, a controller C may coordinate their movements to grind tire T.

Figure 13:
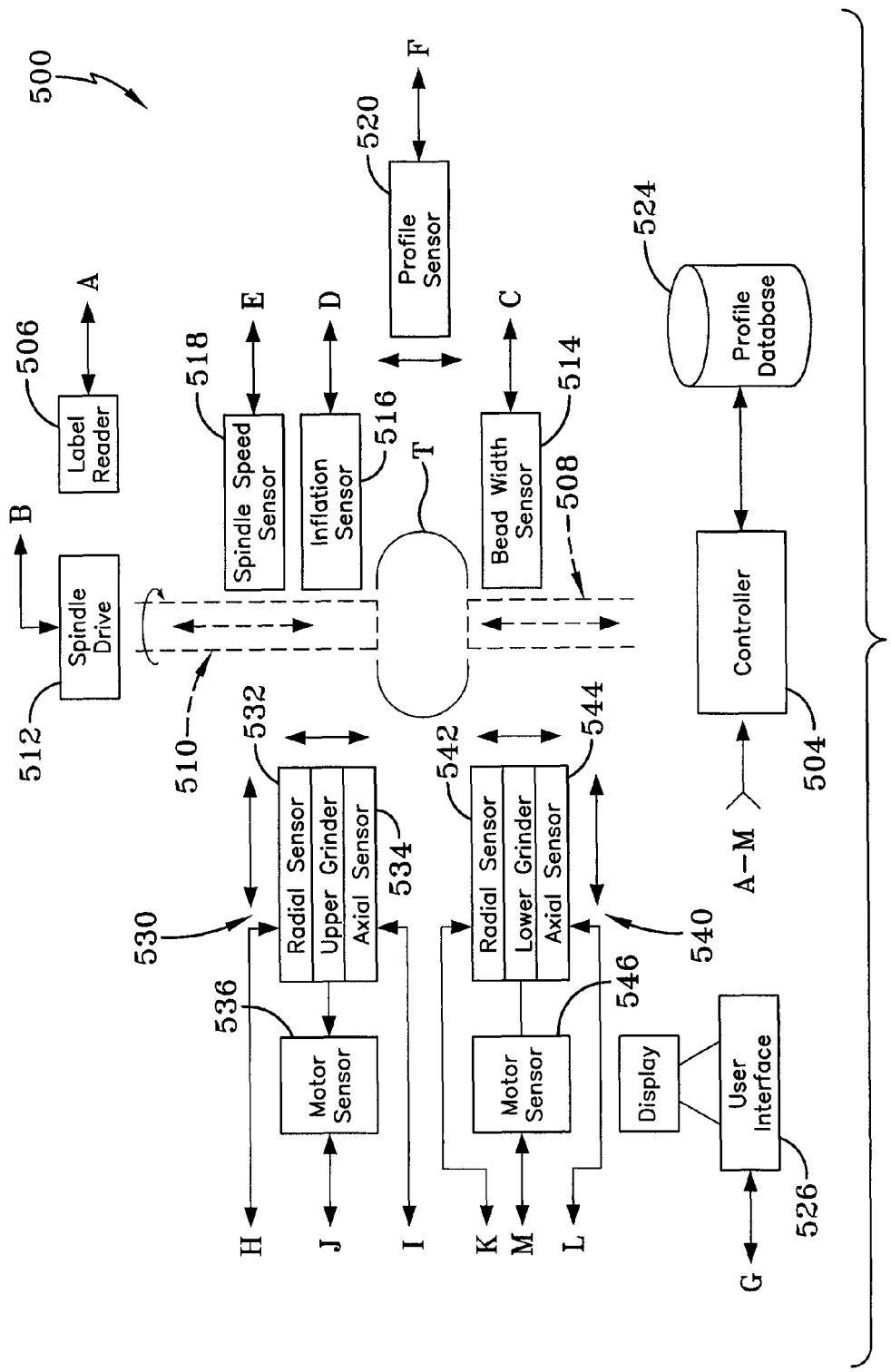
FIG. 13 is a schematic diagram of an alternative embodiment in which a desired tire profile is obtained.

Referring now to FIG. 13, it can be seen that a schematic diagram of a profile generating machine is designated generally by the numeral 500. Unless expressly indicated otherwise, this machine and its associated embodiments employ all components and features in the previously described embodiments. In other words, all of the various mechanisms for handling the tire, and grinding or generating a profile are as in the previous embodiments. The primary distinction of this embodiment from the others disclosed herein relates to the manner in which a desired tire profile is obtained from a tire that does not meet certain specifications, or where it is desired to have a tire profile shaped to a particular configuration. The machine 500 includes a controller 504 which is a processor-based system that utilizes and provides the necessary hardware and software for implementing the various aspects of the machine. The controller 504 receives various inputs from the machine and other sources, such as information related to the tire, and the controller generates output signals for control of the machine to generate a desired profile. The input data received and the output data generated may be transmitted via wire or wirelessly utilizing any appropriate transmission protocol. Connections between the various components are represented by alphabetic letters A-M.

The machine 500 receives a tire designated generally by the capital letter T, which is horizontally orientated and delivered in the course of a manufacturing process. Typically, the tire is delivered after molding or possibly after a testing evaluation for tire uniformity. Of course, any other manufacturing step or steps could be employed prior to the tire entering the profile generating machine 500. As is well understood in the art, the tire has various components, namely a tire bead that defines the aperture of the tire, a sidewall extending from the tire bead, a shoulder extending further from the sidewall and a tread which interconnects the shoulders. The profile generating machine is adaptable for use with most any size diameter and width tire. If a tire is especially wide, it will be appreciated that multiple grinders, as will be discussed in detail, can be used to generate a desired profile.

A label reader 506 is connected to the controller and reads a bar code or other identifying information associated with the tire as it enters the profile generating machine. Typically the information contained on the label and as read by the label reader 506 includes, but is not limited to, a tire part number which identifies a desired tire profile, the materials used in the construction of the tire including durometer and other tire specification parameters. Specifics of the material composition of the tire may be included, such as the amount of silica or other materials which affect the operational performance of the tire. Also included in this information is a desired inflation pressure for operation of the tire, the desired bead width, which is the separation between the beads when the tire is installed on a rim, and an optimal run speed of the tire which is encountered during normal operation of the tire.

A lower spindle 508 and an upper spindle 510 are initially spaced apart so as to receive the tire T from a conveyor system. The upper spindle 510 is maintained in a fixed position while the lower spindle 508 moves vertically so as to engage the tire bead on one side of the tire. The lower spindle moves the tire upwardly so that the upper spindle engages the tire bead on the other side of the tire. The spindles are connected to the controller 504 so as to control the rotation of the tire during evaluation and profiling. A spindle drive 512 is connected to either one or both spindles 508 and 510 so as to rotate the tire in the desired manner.

A bead width sensor 514 is associated with the spindle drive 512 and based upon the information read by the label, the controller adjusts the spacing of the beads with respect to one another. An inflation sensor 516 is associated with the spindles and, again based upon the label information provided, the controller causes inflation of the tire to a desired pressure. A spindle speed sensor 518 is also associated in proximity to at least one or both of the spindles and by utilizing optical encoders, electrical Hall effect switches or other types of speed sensors, confirms the speed of the rotating spindle. The data information collected from the sensors 514, 516 and 518 is transmitted to the controller so as to provide for real-time monitoring of the operational parameters of the generating machine.

Once the tire is loaded into the machine, engaged by the spindles provided with the desired bead width, and inflated, a profile sensor 520 analyzes the profile of the tire during its expected operational performance, i.e., with the proper bead spacing, inflation setting and rotational speed. The profile sensor 520 may be a spot laser which measures the dimensional characteristics of the tire with respect to a center line of the spindle so as to provide a tire profile. The sensor 520 may also be in the form of a line laser, a contact probe or camera. Any one of the sensors selected is sensitive enough to detect precise radial measurements of the tire for further evaluation. Skilled artisans will appreciate that the sensors that may be used have various benefits and detriments and each type of sensor can generate an adequate tire profile image.

Connected to and associated with the controller 504 is a profile database 524. The profile database may include computer-aided-design (CAD) drawings or other previous tire profile configurations which may be desired by the end user for attributes for all tires completed in the manufacturing process. These profiles are stored according to tire part numbers and are configured so as to be associated with tires as read by the label reader 506. In addition to having CAD profiles associated with each specific tire, it will be appreciated that mirror-images of a tire can be utilized in instances where it is known that a particular tire mold has a predetermined defect and the mirror-profile is utilized to provide a desired end profile configuration.

A user interface with a display is designated generally by the numeral 526 and allows for monitoring of all components and sensors associated with the machine 500. The interface 526 allows for a technician to adjust various parameters prior to the profiling step and, if needed, during the profiling step as will be described. The interface allows for selection of certain profiles and for retention of all profile data accumulated for further evaluation.

As described in the previous embodiments, multiple grinders may be used to generate a tire profile. In particular, in this embodiment an upper grinder is designated generally by the numeral 530 and a lower grinder is designated generally by the numeral 540. The upper grinder includes a radial movement sensor 532, an axial movement sensor 534 and a motor current sensor 536 which is associated with a grinder motor or motors as previously described to determine forces and/or the revolutions or rotational operation of the grindstones as previously described. In a similar manner, the lower grinder 540 includes a radial movement sensor 542, an axial movement sensor 544 and a motor current sensor 546. These various movement and current sensors 532-536 and 542-546 all input data to the controller 504. As previously discussed, the grinders may move independently and operate independently of each other. In this manner, the positioning and rate in which the grinders 530 and 540 are placed in contact with the tire as it is rotated by the spindles 508 is precisely controlled. This allows for the grinders to be offset from one another and for the "grind path" of the grinders to be precisely controlled. In other words, the grinders 530 and 540 can be positioned at different radial distances from the spindle's center line. This allows for precise control when removing selected portions of a tire's tread and/or shoulders.

In considering how to obtain the best profile, the controller considers at least one of the tire durometer; the spindle rotational speed; the grind feed rate which controls the amount or speed at which the tire is profiled; the grind depth which controls the amount of material or depth of a grinding pass; the number of grind passes that are employed to obtain the desired profile; whether a mirror half or full profile is utilized in obtaining a desired profile; and any off-set that may be utilized during the grinding process. As skilled artisans will appreciate, the offset relates to the positioning of the one grinder with respect to the other. Also considered in the determination of how best to adjust the operation of the upper and lower grinders are the materials included in the tire such as whether and how much silica is utilized in manufacturing the tire. In some instances, the tire may include different types of compounds that change durometer. With this being the case, the motor sensors 536,546 associated with the grinders detect the rotational speed and current draw of the motors during the grinding process. If a motor current change is detected during grinding, presumably because of a change in the tire's material/durometer or other tire characteristics, then the controller may adjust the motor speed of the grinders 530,540 so as to allow for real-time modification or adjustment to the grinding process. This ensures that a uniform and desired profile can be obtained.

Figure 14:
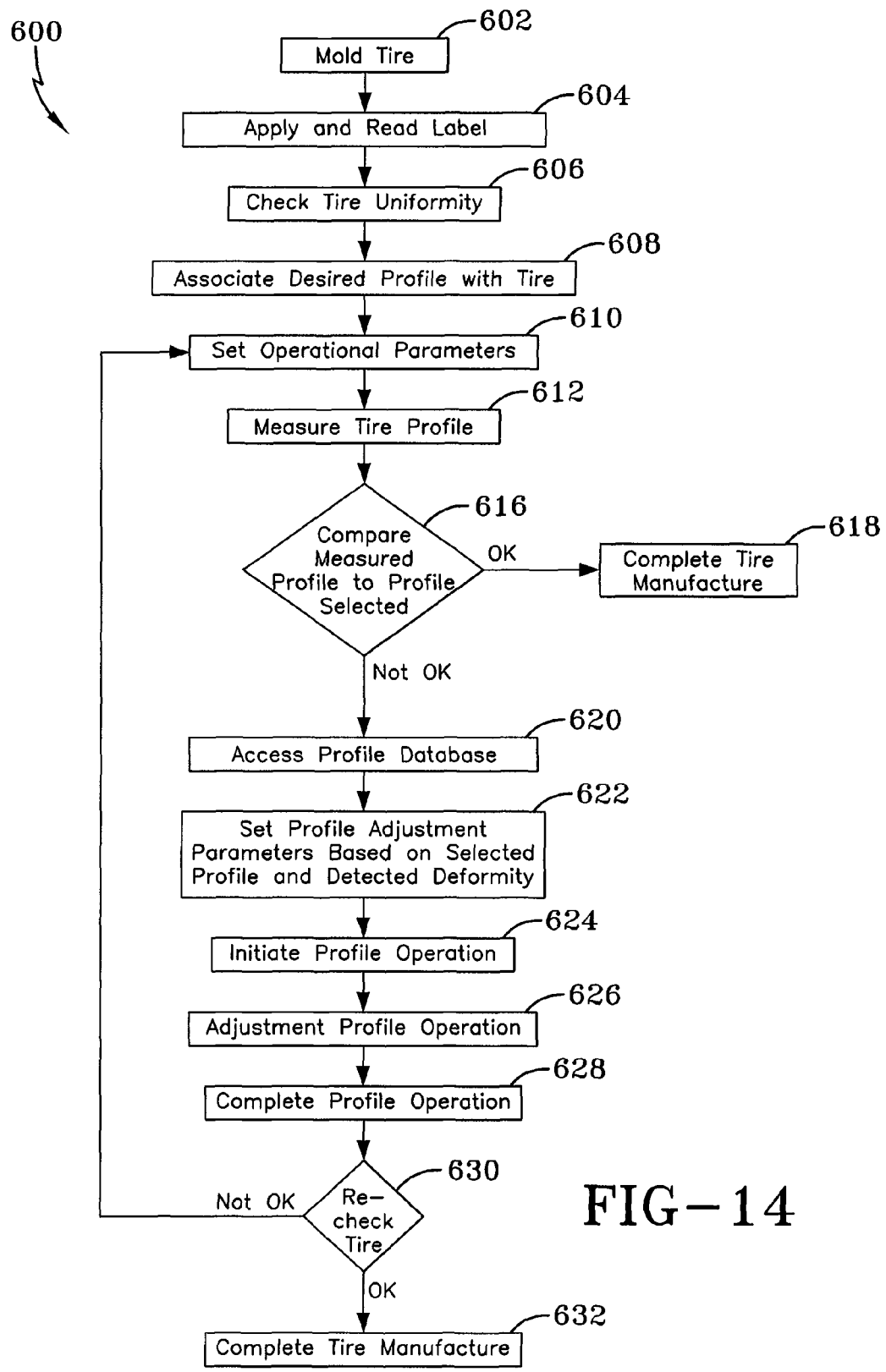
FIG. 14 is an operational flow chart showing a profiling process according to the concepts of the present invention.

Referring now to FIG. 14, it can be seen that an operational flow chart setting out the operation steps for profiling a tire is designated generally by the numeral 600. At step 602 a tire T is molded in a manner well known in the art. At step 604 shortly after the tire is molded a label or other identifier is applied designating the particulars of the tire, its composition, the mold used to form the tire, and other related manufacturing information. As the tire moves through various manufacturing processes, the tire label may be read. As noted previously, the label may be in the form of a bar code or other type of device that can be electronically read, such as a radio frequency identification tag or any other similar device that provides the information related to the tire. Optionally, at step 606, the uniformity of the tire may be checked. The tire uniformity testing may determine whether the tire is acceptable for use or not. Measurements that may be made during tire uniformity include but are not limited to radial run out, lateral run out, conicity, and bulge measurements. If any one of these readings is not within predetermined parameters or definitions, the tire may be appropriately marked or a label may be added to the tire or the information related to that tire can be uploaded into a system so that any time that bar code label is read for that particular tire its uniformity characteristics are also known. Skilled artisans will also appreciate; however, that the tire uniformity step is optional and not required for the implementation of the present invention. In any event, at step 608 a desired profile is associated with the tire. The desired profile may be a drawing on file, such as a CAD drawing, or an exemplary profile maintained in the profile database.

At step 610, the operational parameters for the tire to be examined for association with a particular profile are set. These operational parameters include but are not limited to the pressure as determined by the inflation sensor 516, the bead width as determined by the bead width sensor 514, and the run speed as set by the spindle drive 512. These operational parameters are typically predetermined by the manufacturer and are conveyed in the tire label information associated with each particular tire.

At step 612, after the tire has been inflated and is rotating at a desired speed with all other dimensional criteria set, the profile sensor 520 is moved radially and axially as needed so as to measure the tire profile. As previously discussed, this may be done with a spot laser, a line laser or other device which determines the dimensional characteristics of the tire as it rotates, wherein the dimensional characteristics are based upon a measurement of the tire with respect to the center line of the rotating spindle assembly. As a result, a complete tire profile is generated for the tire received in the profile generating machine 500.

At step 616 the controller 504 compares the measured profile determined at step 612 with the desired profile associated with the tire based upon its label information. In the alternative, a desired profile may be selected from the database 524. If the comparison reveals that the measured profile is within the dimensional limitations of the desired profile, then at step 618 the tire is moved on to the remaining steps of the tire manufacturing process at step 618. However, if at step 616 it is determined that the measured profile does not meet the dimensional limitations of the desired profile, then the process continues at step 620.

At step 620, the profile database is accessed to obtain the precise measurements for the desired tire profile. Based on this information, at step 622 a set of profile adjustment parameters based upon the desired profile and detected deformity are set. In other words, at step 622 the various attributes regarding the tire are considered and also how the deformities can best be corrected. Included in this consideration is the tire durometer; the desired spindle speed in revolutions per minute; a grind feed rate which determines how quickly the grinding stones contained within the upper grinder and lower grinder are laterally and, if needed, radially moved across the tire; a grind depth which determines how much material is to be removed during a grinding pass, the number of grinding passes; and whether a mirror half or full profile is to be utilized during the grinding process. As noted in the previous embodiments and depending upon the width of the tire, multiple grinding assemblies may be utilized. Movement of the grinders 530 and 540 is coordinated so as to shape the tire according to a desired profile. The upper and lower grinder may be offset and are configured such that they work in tandem with one another to obtain the desired profile.

Once these parameters are set, then the profile generating machine 500 begins the profile operation at step 624. During the grinding or profiling procedure at step 626 the various sensors are continually monitored and if one detects abnormal operation, other parameters can be adjusted. For example, the motor sensors 536 and 546 monitor the motor current to determine if they are operating within the desired speeds. If for some reason, such as a change in tire durometer based upon the use of different materials in the tire molding compound is detected, the controller can adjust the grind feed rate, the spindle speed, the grind depth and/or any other related operational parameters so as to ensure that the desired profile is attained. Upon completion of the profiling operation at step 628, the grinding assemblies are moved out of operational position with the tire such that the profile sensor 520 may reevaluate the tire profile. If at step 630 the rechecked tire still does not meet the operational parameters, the process can return to step 610 to repeat steps 610 through 628. If the tire is acceptable, then at step 632 the tire is disengaged from the machine 500 and proceeds with the remaining manufacturing processes. A flag can be set at step 630 so that if the tire does not complete the process and is acceptable at completion of the second operation of step 630 then the tire can be rejected for further evaluation.

Figure 15:
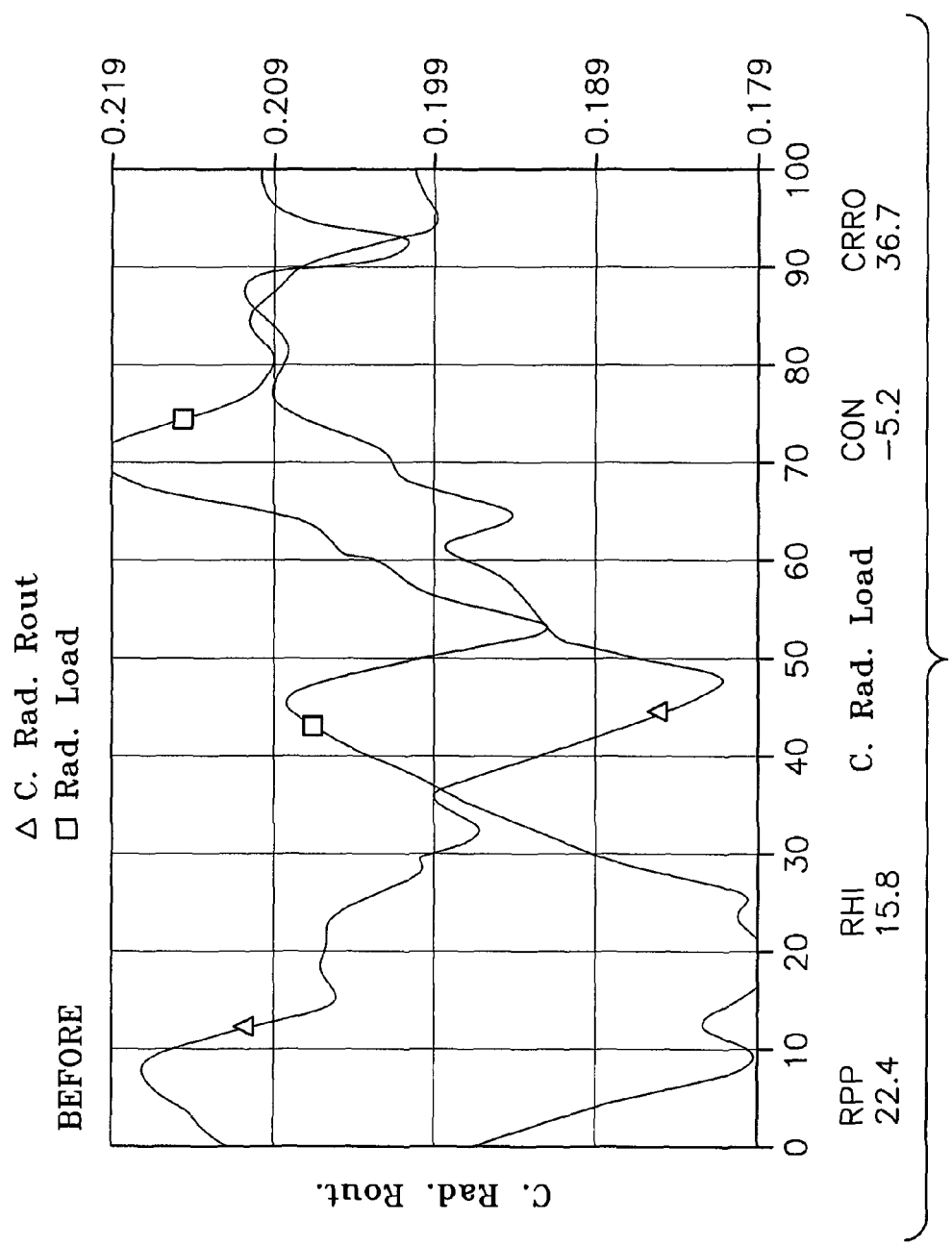
FIG. 15 is a graph representation of a tire waveform prior to profiling of a tire.
Figure 16:
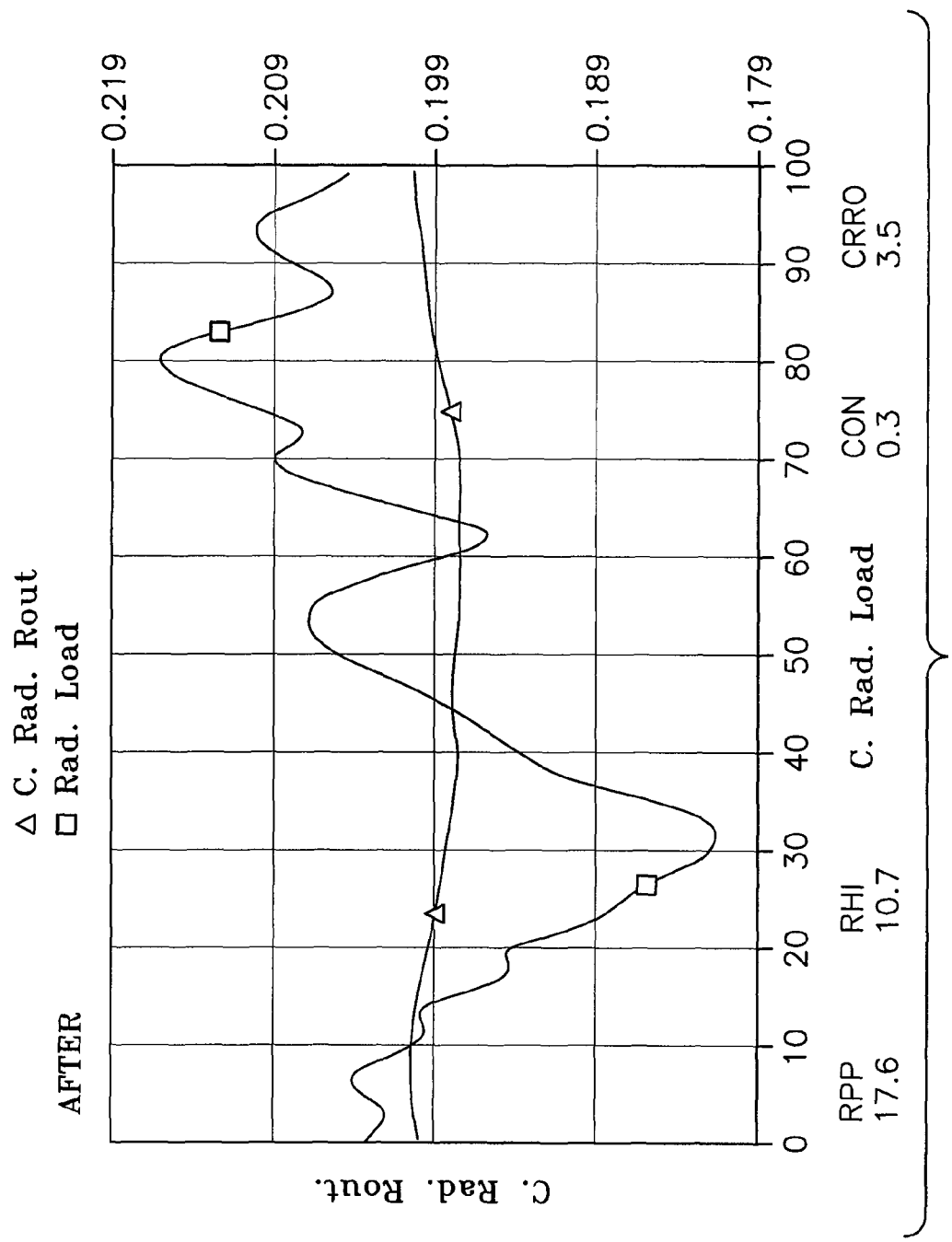
FIG. 16 is a graph representation of a tire waveform after profiling of the tire.

Referring now to FIGS. 15 and 16 waveform readings are provided that illustrate the benefits of profiling a tire according to the present invention. FIG. 15 shows the central radial run out (C. Rad. Rout.) which is the amount of out of roundness in the center of the tread while an exemplary tire is rotated. Also shown is the radial load (C. Rad. Load) which is the amount of load (usually in pounds or kilograms) pushing against a tire tread toward the center of the tire. It will be appreciated that these values are detected using a load wheel such as provided in a tire uniformity machine. In any event, additional readings that are obtained from the analysis indicate that a RPP value, which is the difference in radial load from the greatest to least amount in one rotation of the tire, a radial first harmonic (RH1), a conicity value (CON) and a center radial run out (CRRO) value are provided. As seen in FIG. 16, these values are significantly reduced keeping in mind that a conicity value closest to zero is preferred. Accordingly, the benefits of utilizing a profiling machine according to the concepts of the present invention are readily apparent upon viewing FIGS. 15 and 16.

Further benefits provided by the profile generating machine 500 and its manufacturing procedure as evidenced by the operational flow chart 600 allow for a tire to be manufactured which meets precise performance specifications. The profiling operation is automated in such a manner so that it can be done in two to three minutes as opposed to fifteen or more minutes for manually loading a tire into a grinding machine and determining the area that needs to be ground and implementing the grinding operation. Moreover, the repeatable nature of the machine 500 provides significant benefits in the amount of time taken to obtain the desired profile and it is much more efficient and operationally correct than previous grinding machines. The machine also provides flexibility in allowing a user to select different desired profiles and the ability to do so in a quick and efficient manner. The profiling machine also allows for specific profiling to accommodate known manufacturing defects provided by a tire mold. For example, if a tire mold is known to have a dimensional deformity, it can be easily corrected utilizing the profiling machine instead of having to destroy the mold and its related investment. The profiling machine can also be used to supplement the tire uniformity operation given that the profiling machine corrects most all defects usually found in a tire uniformity test.

In light of the foregoing, it should thus be evident that a tire uniformity machine grinding assembly according to the concepts of the present invention substantially improves the art. While, in accordance with the patent statutes, only the preferred embodiment of the present invention has been described in detail hereinabove, and shown in the accompanying drawings, the present invention is not to be limited thereto or thereby. It will be appreciated that various modifications may be made to the above-described embodiment without departing from the spirit of the invention.

What is claimed is:

1. A process for removing material from a tire comprising:
providing at least one grinding assembly having a grinding head with at least one grindstone rotatably supported thereon, said grinding head being movable axially and radially relative to the tire;
providing actuators operatively connected to said grinding assembly to move the grinding head;
providing a controller in communication with said actuators and at least one sensor that monitors operation of said grinding head; and
profiling the tire by contacting said grindstone to the tire to remove material from the tire and adjusting the position of said grindstone while it is in contact with said tire to define a selected profile by grinding a tire to match a profile stored in the system controller, wherein said controller uses the stored profile to create signals sent to the actuators to move the grinding head to a series of selected positions creating the selected profile.

2. The process of claim 1, wherein plural grinding assemblies are provided, the process further comprising:
calibrating said plural grinding assemblies to a set point and initially moving said grinding assemblies to said set point before removing material from the tire.

3. A process for removing material from a tire comprising:
providing at least one grinding assembly having a grinding head with at least one grindstone rotatably supported thereon, said grinding head being movable axially and radially relative to the tire;
providing actuators operatively connected to said grinding assembly to move the grinding head;

providing a controller in communication with said actuators and at least one sensor that monitors operation of said grinding head;

measuring a profile of the tire with a profile sensor;

comparing said measured tire profile to a selected tire profile; and profiling the tire by contacting said grindstone to the tire to remove material from the tire and adjusting the position of said grindstone while it is in contact with said tire to define said selected profile so that the tire substantially matches said selected profile.

4. The process according to claim 3, further comprising:

coupling a motor to said at least one grinding stone so as to rotate said at least one grinding stone during the profiling step;

associating a motor sensor to said motor to detect forces applied to the tire during the profiling step; and adjusting operation of said motor based on output received from said motor sensor.

5. The process according to claim 3, further comprising:

re-checking said tire profile to said selected tire profile; and repeating the performing step if the tire does not substantially match the selected tire profile.

6. The process according to claim 3, further comprising:

applying a label to the tire which associates the tire with said selected profile; and associating said tire profile with the tire.

7. The process according to claim 3, further comprising:

completing tire manufacture if said measured tire profile substantially matches said selected tire profile.

8. The process according to claim 3, further comprising:

receiving the tire in a profiling machine so that the tire is rotatable by a spindle drive; and setting at least one of bead width, inflation pressure and spindle speed based on information provided on said label.

9. The process according to claim 8, further comprising:

setting profile adjustment parameters by said controller based on bead width, inflation pressure, spindle speed, said measured profile and said selected profile, wherein said controller utilizes said profile adjustment parameters to control operation of said at least one grinding assembly.

10. The process according to claim 9, further comprising:

setting profile adjustment parameters for at least one of grind feed rate, grind depth and number of grind passes.

\* \* \* \* \*